US007596699B2

(12) United States Patent
Kwok

(10) Patent No.: US 7,596,699 B2
(45) Date of Patent: *Sep. 29, 2009

(54) BATTERY AUTHENTICATION SYSTEM

(75) Inventor: Chung Y. Kwok, Irvine, CA (US)

(73) Assignee: Intersil Americas Inc., Milpitas, CA (US)

( * ) Notice: Subject to any disclaimer, the term of this patent is extended or adjusted under 35 U.S.C. 154(b) by 943 days.

This patent is subject to a terminal disclaimer.

(21) Appl. No.: 10/875,706

(22) Filed: Jun. 24, 2004

(65) Prior Publication Data

US 2005/0188206 A1  Aug. 25, 2005

Related U.S. Application Data

(60) Provisional application No. 60/549,175, filed on Mar. 2, 2004, provisional application No. 60/548,934, filed on Mar. 1, 2004, provisional application No. 60/547,267, filed on Feb. 24, 2004, provisional application No. 60/547,144, filed on Feb. 24, 2004.

(51) Int. Cl.
*H04L 9/32* (2006.01)

(52) U.S. Cl. .................. 713/176; 713/161; 713/168; 713/169; 713/170; 713/171; 713/172; 380/247; 375/257; 326/30; 333/32; 379/398

(58) Field of Classification Search .......... 380/247; 713/176, 161, 168–172; 375/257; 326/30; 333/17.3, 32; 379/398
See application file for complete search history.

(56) References Cited

U.S. PATENT DOCUMENTS

| 4,388,725 | A | * | 6/1983 | Saito et al. .................. 375/257 |
| 4,502,024 | A | | 2/1985 | Nishikawa et al. |
| 4,611,335 | A | | 9/1986 | Arai et al. |
| 4,746,898 | A | * | 5/1988 | Loeppert ....................... 341/70 |
| 4,943,926 | A | * | 7/1990 | Guzman-Edery et al. ...... 702/79 |
| 5,638,448 | A | * | 6/1997 | Nguyen ......................... 380/29 |
| 5,724,368 | A | * | 3/1998 | Zook ........................... 381/71.1 |
| 5,727,447 | A | | 3/1998 | Shiraishi et al. |
| 5,905,406 | A | | 5/1999 | Sugden et al. |
| 7,280,629 | B2 | | 10/2001 | Dunning et al. |

(Continued)

FOREIGN PATENT DOCUMENTS

DE  10216396  10/2003

OTHER PUBLICATIONS

Menezes et al.; "Handbook of Applied Cryptography, Challenge-Response Identification (Strong Authentication)" 1997, Handbook of Applied Cryptography, CRC Press Series on Discrete Mathematics and its Applications, Boca Raton, Fl, CRC Press, US, pp. 397-404,490, XP002282273.

*Primary Examiner*—Kambiz Zand
*Assistant Examiner*—Canh Le
(74) *Attorney, Agent, or Firm*—Howison & Arnott, LLP

(57) ABSTRACT

An authentication process for authenticating a battery to a cellular telephone includes the step of receiving a challenge from the cellular telephone at the battery over a single wire conductor. In response to the challenge, the seed values are retrieved from the memory and a response is generated based upon the challenge and the seed values. The response is transmitted back to the cellular telephone from the battery over the single conductor so that a comparison with a similar response generated by the cellular telephone may be made.

14 Claims, 21 Drawing Sheets

U.S. PATENT DOCUMENTS

| | | | |
|---|---|---|---|
| 6,321,354 B1 * | 11/2001 | Prunier | 714/726 |
| 6,530,029 B1 | 3/2003 | Metchev | |
| 6,567,476 B2 * | 5/2003 | Kohl et al. | 375/293 |
| 6,777,975 B1 * | 8/2004 | Dabral et al. | 326/30 |
| 6,788,559 B2 | 9/2004 | Sheng et al. | |
| 6,904,558 B2 * | 6/2005 | Cavanna et al. | 714/781 |
| 6,990,042 B2 | 1/2006 | Stark | |
| 7,053,667 B1 | 5/2006 | Tang | |
| 7,290,196 B1 * | 10/2007 | Annayya et al. | 714/758 |
| 2003/0061519 A1 * | 3/2003 | Shibata et al. | 713/202 |
| 2004/0022546 A1 * | 2/2004 | Cochran et al. | 398/183 |
| 2004/0101060 A1 | 5/2004 | Simon et al. | |
| 2004/0145487 A1 * | 7/2004 | Wendelrup et al. | 340/636.1 |
| 2004/0264230 A1 | 12/2004 | Brand et al. | |
| 2005/0001589 A1 * | 1/2005 | Edington et al. | 320/128 |

* cited by examiner

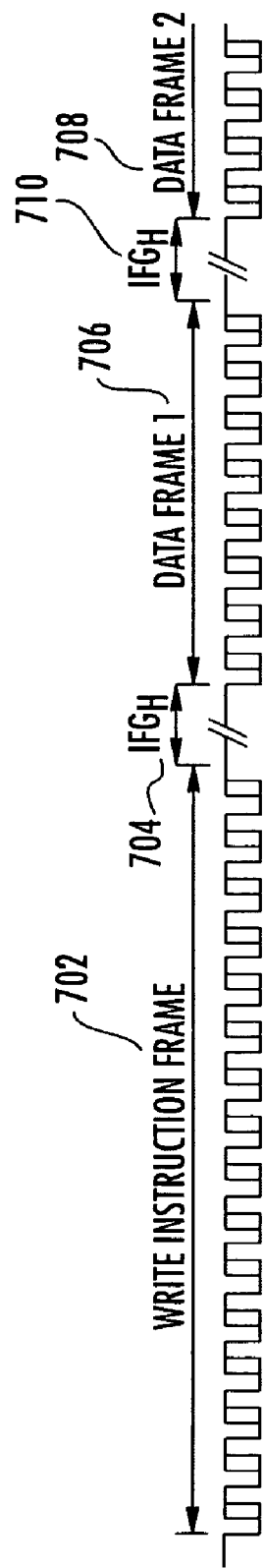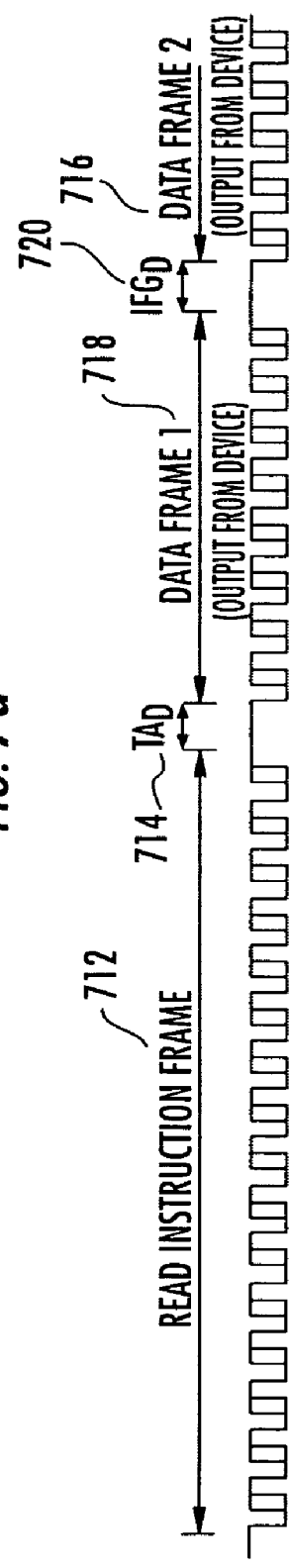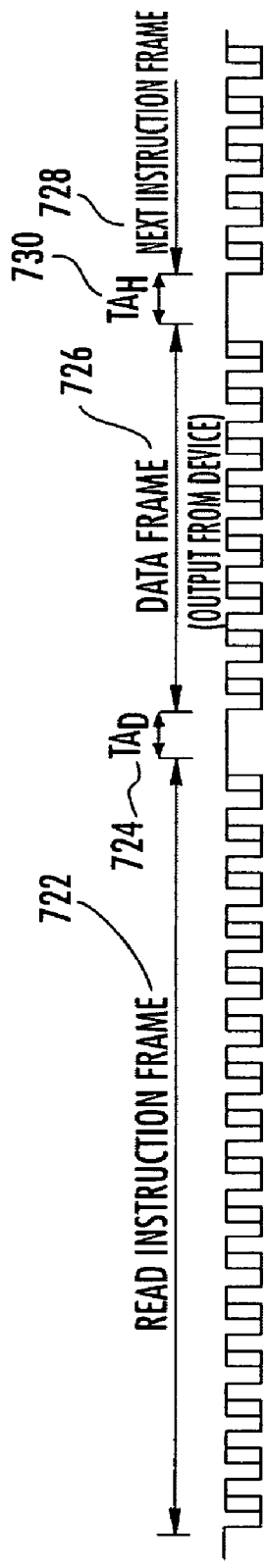

BATTERY AUTHENTICATION SYSTEM

RELATED APPLICATIONS

This application claims priority from U.S. Provisional Application No. 60/547,267, filed on Feb. 24, 2004, U.S. Provisional Application No. 60/548,934, filed on Mar. 1, 2004, U.S. Provisional Application 60/549,175, filed on Mar. 2, 2004, and provisional application 60/547,144 filed on Mar. 24, 2004.

TECHNICAL FIELD OF THE INVENTION

The present invention relates to single wire communication between a master device and a slave device, and more particularly, to single wire communication utilizing pulse widths to represent transmitted data between a host device and a slave device.

BACKGROUND OF THE INVENTION

At times it may be necessary to interconnect first and second devices via a single wire connection. When devices are connected in this fashion, one device is designated as the host device for controlling the communications between the two devices while the other device is designated as the slave device so as to control traffic on the single wire bus. Host and slave devices interconnected by a single wire require the use of a single wire interface protocol to enable the transmission of data over the single wire between the two devices. Previous systems have used a number of different techniques to transmit information over a single wire. One such system controls transmissions between a host device and a slave device by initially transmitting control information from the host device to the slave device. After transmission of the control information, the host device next drives the signal on the single wire low to indicate the beginning of a transmission period. After a predetermined delay from the start of the transmission period, the data to be transmitted between the host device and the slave device is indicated on the single wire by driving the voltage level on the line high if a logical "1" is being transmitted or maintaining the signal at a low level if a logical "0" is being transmitted. Thus, the time period required to transmit either a logical "1" bit or a logical "0" bit is the same no matter which logical bit is being transmitted since the logical data always resides within a predetermined delay from the initiation of the transmission period.

Digital authentication can be an important part of modern systems. Authentication has uses in communication, transactions and devices. There are often trade-offs in authentication protocols between speed and security. It may be important to have an authentication system that may be performed quickly and still provide adequately secure authentication. Authentication of devises such as a battery are necessary to insure that a correct battery is being used with a particular product. Since battery and associated devices may often times be connected by a single conductor. An authentication process which may be performed over a single wire conductor would be useful.

SUMMARY OF THE INVENTION

The present invention disclosed and claimed herein, in one aspect thereof, comprises an authentication process for authenticating a battery to a cellular telephone. The battery receives a challenge from the cellular telephone over a single wire conductor interconnecting the cellular telephone with the battery. In response to the challenge, seed values are retrieved by the battery from a memory and used to generate a response to the challenge from the cellular telephone. The generated response is transmitted back to the cellular telephone from the battery over the single wire conductor where comparison may be made to determine whether or not the battery should be authorized.

BRIEF DESCRIPTION OF THE DRAWINGS

For a more complete understanding of the present invention and the advantages thereof, reference is now made to the following description taken in conjunction with the accompanying Drawings in which:

FIGS. 7a-7c illustrate the bus transaction protocol for multibyte Read and Write operations and back-to-back transactions;

DETAILED DESCRIPTION OF THE INVENTION

Figure 1:
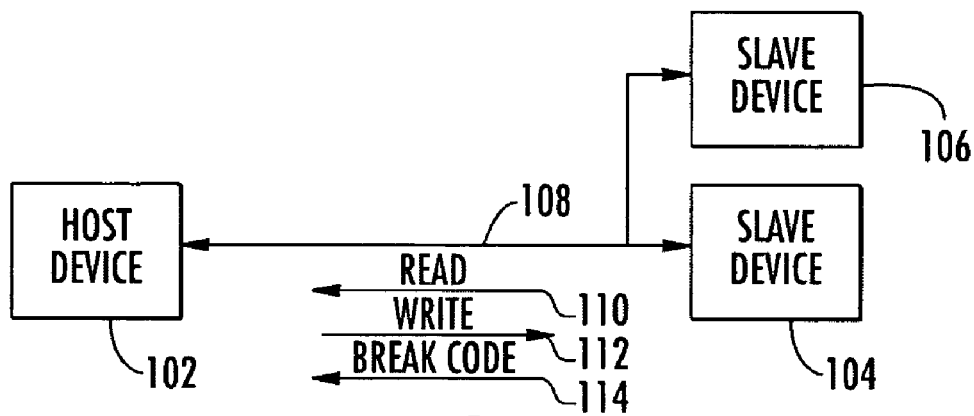
FIG. 1 is a block diagram illustrating a single wire connection between a host device and a pair of slave devices.

As will be described more fully hereinbelow, the data is transmitted from the host device 102 to the slave device 104, 106 in blocks of data, each data block comprised of eight bits of data or a single byte of data. This is a conventional technique for transferring data. However, data could be transmitted one bit at a time. This one bit data transmission might present a problem, as each Write operation requires configuration information to be sent to the slave device indicating what operation is to follow, with the preferred embodiment being to transfer blocks of data comprised of one or more bytes. Whenever data is to be transmitted from the host 102 to the slave 104, 106, it is necessary to precede such an operation with the transfer of access instructions. The slave is always in a default receive mode such that it will receive access instructions. All instructions must typically be on a word boundary such that the data word will be four bits long, eight bits long or sixteen bits long (and they could be much longer). Therefore, the instruction word will be received as a defined number of bits. In a default mode, the slave 104, 106 must be aware of the number of bits that comprise the instruction. Thus, when the group of bits representing the instruction are received by the slave 104, 106, the slave 104, 106 then configures itself for the appropriate mode of operation, i.e., to receive data or transmit data. Again, this data will be transmitted in single serially transmitted bits which would typically have some type of word boundary such that the data will be transmitted in a block of bits representing a byte, or longer block. This is such that the receiving device is aware of when the transmission has been completed without requiring additional overhead bits indicating the start of a transmission or the stop of a transmission.

The operation of the system from a general standpoint is such that there are provided two or more nodes that can be attached to the transmission line 108. Only one of these nodes, be it the host device 102 or either of the slave devices 104 or 106, can transmit data at any one given time. The host device 102 is basically the master node that controls all operations to ensure that there is no "bus contingent." However, once the host device 102 configures the operation for which device is transmitting information, then that operation is handed over to the transmitting one of the devices. This could be the host device 102 or either of the slave devices 104 or 106. All of the other devices are in a receive mode. Although the disclosed embodiment discusses a Read operation as causing one of the slave devices 104 or 106 to enter the transmit mode and transmit data to the bus 108 for specific receipt by the host device 102, it is possible that transfer of data could be between slave devices 104 and 106.

The configuration is such that a transmit circuit on the transmitting one of the devices will have total access to the data line 108 for the purpose of transmitting data thereto with the receiving one of the devices then configured to receive the data in the appropriate manner as set by the original configuration information sent by the host device 102. As will be described in more detail hereinbelow, the transmitting one of the devices provides the data clock information which allows data to be clocked into the receiving one of the devices. The timing reference for the data clock is disposed locally at the transmitting one of the devices wherein the timing reference at the receiving one of the devices is not synchronized to the timing reference at the transmitting one of the devices.

Typically, in any type of serial data transmission, there will be some type of start indicator, followed by the data or content, followed by termination information. In some more complex systems, this could involve the transmission of start bits, then data bits followed by termination or stop bits. In the present disclosure set forth herein, the data is sent on a bitwise basis, such that each bit is comprised of start information, data information and stop information. This is facilitated through the use of some type of sync command that indicates to the receiving device that data is going to be transmitted, followed by transmission of a single bit data wherein a decision can be made by the receiving device as to the logic state thereof, this followed by stop information. Once a bit has been transmitted, the receiving device will await the next bit to be transmitted in the block, which will again require the start information, data information and stop information. After the reception of the block of data by the receiving device, the receiving device will then fall back into the default mode of operation if it is a slave 104, 106 or in to the control mode if it is the host device 102.

As will further be fully disclosed herein, the start information for data transmission will be pulling of the line low, the content will be determined by the length of time the line is held low and the stop information will be the pulling of the line high.

Referring now to the drawings, and more particularly to FIG. 1, a connection between a host device 102 and first and second slave devices 104 and 106 is illustrated. The host device 102 and the pair of slave devices 104 and 106 are connected via a single wire interface 108. Over the single wire interface 108 the host device 102 and slave devices 104, 106 may engage in Read operations 110 wherein data is Read by the host device 102 from one of the slave devices 104, 106, Write operations 112 wherein the host device writes data to one of the slave devices 104, 106, and transmission of a break code 114 indicating a problem with a previous Write operation from one of the slave devices 104, 106 to the host device 102 over the single wire connection 108. It is noted that only one device can transmit information at any given time.

Figure 2:
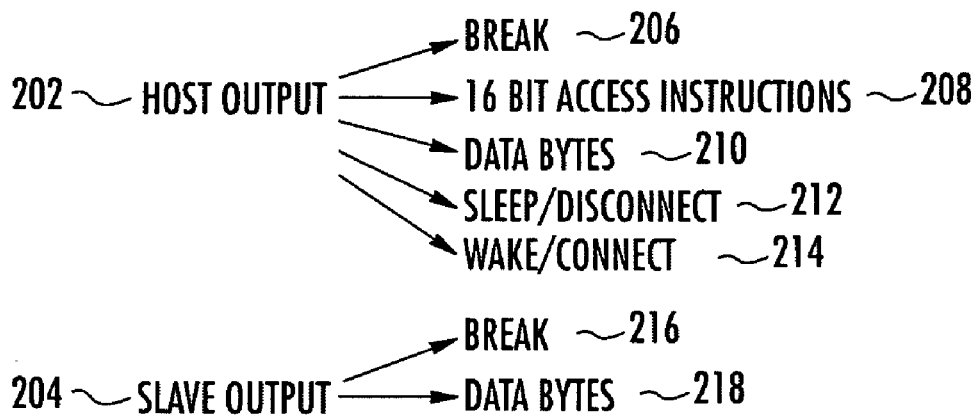
FIG. 2 illustrates the various bus commands able to be generated using the single wire bus interface of the present invention.

The communication protocol for transmitting the single bit of data over the single wire bus 108 is divided into a number of commands which may be transmitted from the slave device 104, 106 or the host device 102. These are more fully illustrated in FIG. 2 wherein the commands are divided into host output commands 202 and slave output commands 204. A break command 206 transmitted from the host output will reset device bit counters, timers and chip selection within a slave device 104, 106. The break command 206 will also be used to void a current packet transfer from the host device 102 to one of the slave devices 104, 106. The break command 206 can be transmitted at any time and may be sent alone or in the middle of a packet transfer. A 16-bit access instruction command 208 consists of a 1-bit chip select code enabling the addressing of two separate devices, a 2-bit command code, a 2-bit register bank code, an 8-bit address location, and a 3-bit byte field. The 16-bit access instruction will be more fully discussed hereinbelow with respect to FIG. 6.

Data bytes 210 comprises an 8-bit block of data in the disclosed embodiment transmitted from the host output to the slave. Data bytes 210 are transmitted if the command code of the access instruction command 228 indicates the performance of a Write operation, i.e., transfer of data from the host to the slave. The number of blocks transmitted from the host output 202 depends upon the number indicated within the byte field in the 16-bit access instruction command 208. A sleep/disconnect command 212 is used to place the slave device into a sleep mode and the wait/connect command is used to awaken the slave device 104, 106 from the sleep mode.

The slave output commands 204, during a Read Operation for transfer of data from the slave to the host include a break command 216 that is used to indicate to the host that a last instruction received from the host was not executed for some reason. Additionally, when an error occurs in Reading a last instruction, or when a EEPROM Write in progress operation forbids access to the EEPROM, the break command 216 would be transmitted from the slave output. The break command 216 may also be used to flag an alarm/interrupt event occurring at the slave device. If a host instruction following a flagged alarm/interrupt event does not attempt to read the status/interrupt register, an additional break command 216 may be issued by the slave output. Data bytes 218 transmitted from the slave consist of 8-bit blocks of data. The data bytes 208 are transmitted if the command code of the access instruction command 208 indicates a Read operation. The number of blocks transmitted by the slave output 204 depends upon the bytes field within the access instruction command 208.

For the Write operation 112, i.e., transfer of data from the host to the slave, the host device 112 performs the Write operation 112 and no data is transmitted back from the slave devices 104, 106. For a Read operation 110, i.e., transfer of data from the slave to the host, the slave device 104, 106 sends 1-4 data byte packets to the host device 102 depending upon the preceding instruction(s) transmitted, from the host device 102. For the break code operation 114, the slave devices 104, 106 transmit a break code if they are unable to perform the instruction given by the host device 102 due to a bus error or a EEPROM access occurring during the EEPROM Write process.

Figure 3:
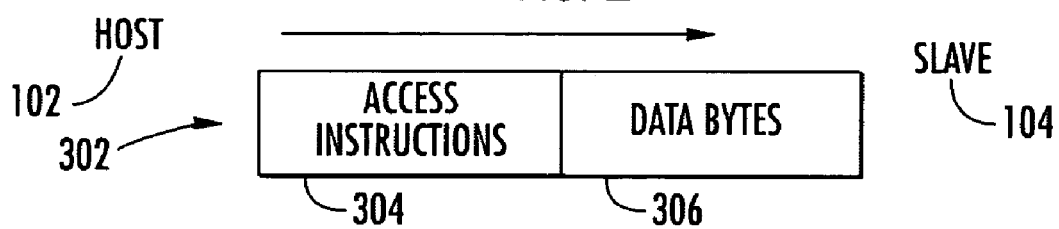
FIG. 3 illustrates the structure of a Write operation from a host device.
Figure 4:
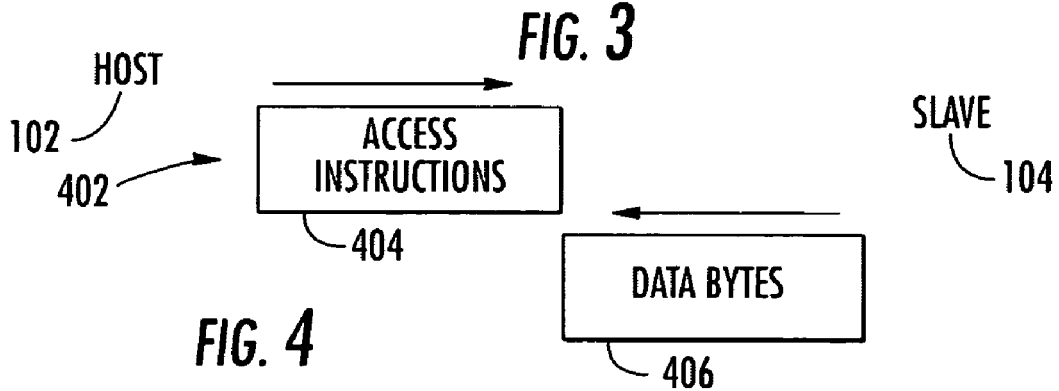
FIG. 4 illustrates the structure of a Read operation at a host device.

Referring now to FIGS. 3 and 4, there are illustrated the structure of the commands transmitted between the host device 102 and slave devices 104, 106 during a Write operation 302 and a Read operation 402, respectively. In FIG. 3, for the Write operation 302, the access instruction 304 is initially transmitted to the slave devices 104, 106 from the host device 102. The data bytes 306 to be written from the host device 102 to the designated one of the slave devices 104, 106 are also transmitted in the same direction. For the Read operation 402 (FIG. 4) between the host device 102 and the slave device 104, for example, the access instructions 404 are initially transmitted from the host device 102 to the slave device 104 to initiate the Read operation. The host device 102 then goes into the receive mode and releases control of the serial bus 108. The slave device 104 then seizes control of the serial bus 108 by entering the transmit mode and the data bytes 406 to be received by the host device 102 are transmitted from the slave device 104 back toward the host device 102.

Figure 5:
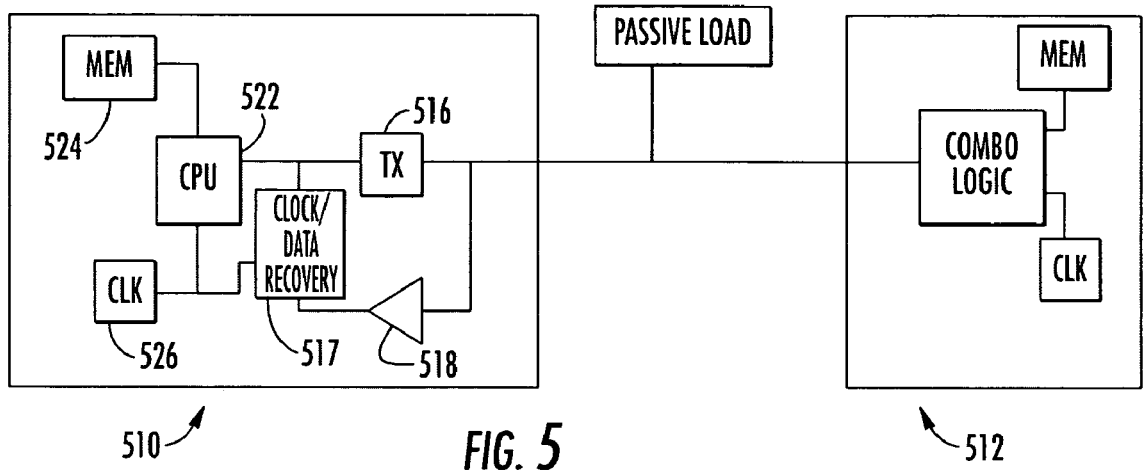
FIG. 5 is a block diagram illustrating a connection between a host device and a slave device using a single wire connection over which data may be transmitted according to the present invention.

Referring now to FIG. 5, there is illustrated the interconnection of a host device 510 and a slave device 512 via a single wire 514. The host device 510 and slave device 512 include circuitry enabling single wire communication over line 514. Line 514 is held weakly high by a passive load device 515 located between the source voltage and line 514. In the Write mode, transmitter 516 at the host device 510 drives line 114 low to facilitate transmission of logical data from the host device 510, this transmitter 516 being an open drain drive transistor. A receiver 518 detects voltage levels transmitted over line 514. The receiver 518 in the host device 510 works in conjunction with the clock/data recovery circuit 515 to detect the occurrence of rising and falling edges of pulses transmitted over line 514 between host device 510 and slave device 512. As will be more fully described hereinbelow, by detecting the occurrence of rising and falling edges of the pulses transmitted over line 514, logical data transmitted between the host device 510 and slave device 512 may be determined. The clock/data recovery circuit 515 enables determination of the received serial data and recovery of the clock signal associated with a transmitted data clock, which transmitted data clock is contained within the transmitted data. The clock/data recovery circuit 517 determines the pulse widths associated with the selected logic states transmitted from the host device 510 to the slave device 512. The clock/data recovery circuit 517 further assists in determining the logic states associated with the determined pulse lengths received from a transmitting device.

The host device 510 further includes a central processing unit 522 for providing all processing functionalities of the host device 510. The CPU 122 controls the manner and timing in which transmitter 516 will actively pull down the voltage levels on line 514 and upon which the transmitter 516 releases line 514 enabling the voltage levels to return to the high level as dictated by the passive load 515. Memory 524, associated with the CPU 522, stores logical data that is transmitted to the slave device 512 and received from the slave device 512.

A clock circuit 526 enables the generation of pulse widths transmitted from the host device 510 to the slave device 512 in a manner which will be more fully described hereinbelow, and which will allow determination of the pulse widths of received signals. A clock circuit 527 located within the slave device 512 operates pseudo-synchronously with respect to the clock 526 located in the host 510. The data that is received by the slave device 512, however, is synchronized to a data clock within the host 510. In order to clock this data into a memory 525, the slave device 512 includes a clock recovery system for recovering the data clock from the received data stream. Similarly, when receiving data from the slave 512, the host 510 has a similar clock recovery system. The circuitry for performing this operation will be more fully described with respect to FIG. 5a.

The slave device 512 includes combinational logic in a block 529 for performing the functions described for transmitting and receiving data. The combinational logic performs the functions of the clock/data recovery circuit 515 and the transmitter 516 described herein above with respect to the host device 510.

When designing an integrated circuit with conventional techniques, the design is carried out with various design tools. These design tools allow the circuit designer to functionally describe a circuit block in terms of the functions performed on received data such that data and timing information can be output from the circuit block with the desired results. However, the designer no longer specifically designs logic circuitry to perform a specific function and then combines these various logic circuits to provide an overall combinatorial logic circuit; rather, the designer inserts the functionality into the program and the program then generates the circuit necessary to facilitate such operation. However, for the purpose of illustration, some representative circuitry will be set forth, it being realized that the entire functionality of the integrated circuit may result in significantly different circuitry and additional circuitry not disclosed. The circuitry required for reading and writing to memory will not be described, as this is conventional circuitry.

Figure 5A:
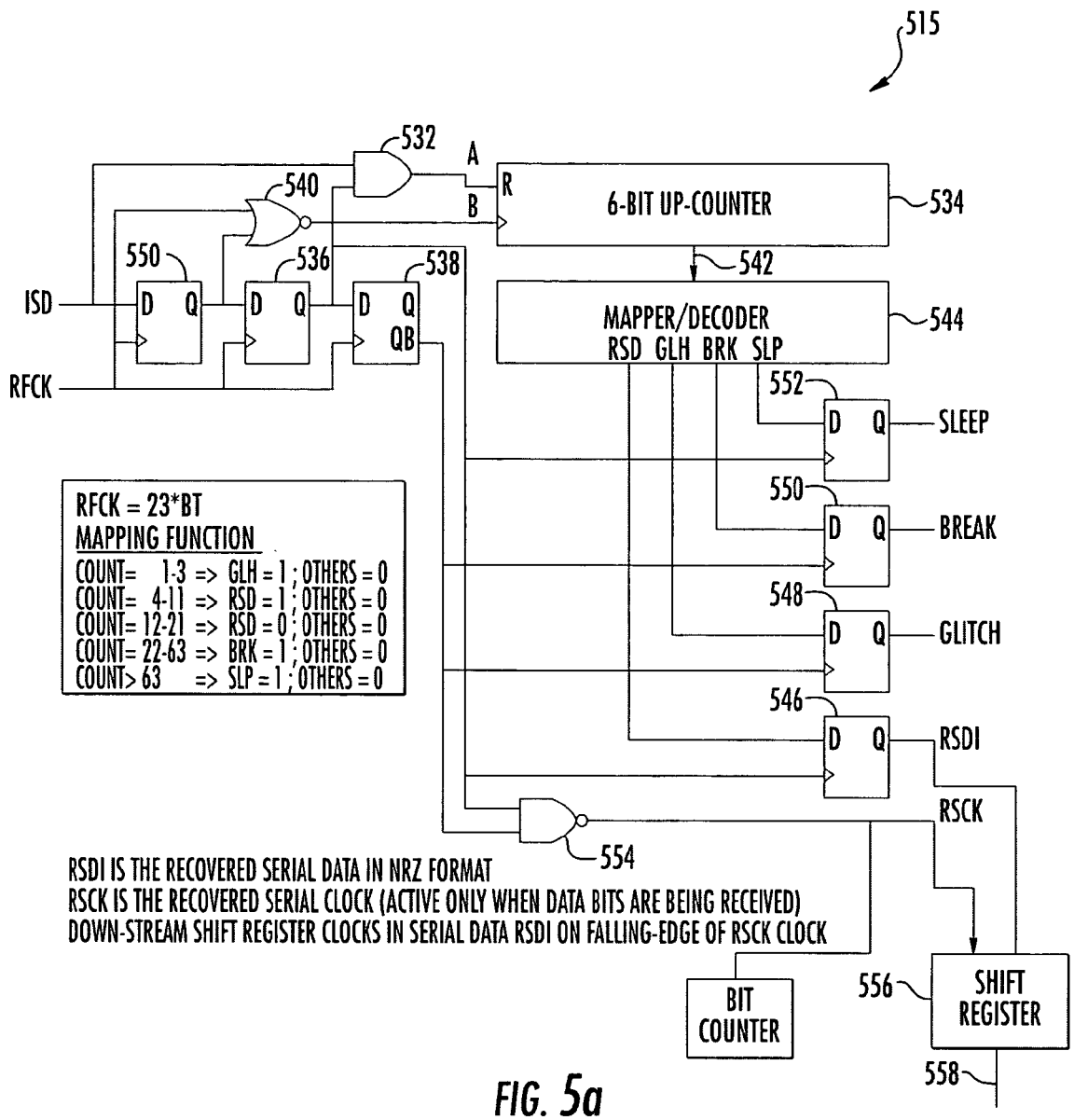
FIG. 5a is a block diagram of the clock/data recovery circuit.

Referring now to FIG. 5a, there is illustrated a logical block diagram of the clock/data recovery circuit 515 in the host device 510, recognizing that such is present in the slave device 512 also. The received serial data (ISD) and a high speed reference clock (RFCK) from the clock 526 are provided to the clock/data recovery circuit 515 from the central processing unit 122. The RFCK signal will equal 23*the bit time, which will be more fully discussed in a moment, such that there will be 23 clock cycles of RFCK for each bit of data. The data signal received over the single wire connection is input to the D-input of a D flip-flop 530. The data signal is also input to one input of an AND gate 532. The second input of AND gate 532 is connected to an output of D flip-flop 536. The output (A) of the AND gate 532 is provided to the input of a 6-bit up-counter 634. Also provided to the clock input of the D flip-flop 530 is the reference clock (RFCK). The RFCK signal is also provided to the clock inputs of D flip-flops 536 and 538. Flip-flop 536 has its D-input connected to the Q-output of flip-flop 530 and the D-input of flip-flop 538 is connected to the Q-output of flip-flop 536. The Q-output of flip-flop 530 is also connected to one input of a NOR gate 540 having its other input connected to the RFCK signal. The output (B) of NOR gate 540 is connected to the clock input of the 6-bit up-counter 534. The flip-flops 530, 536 and 538 provide delayed outputs after received serial data for one, two and three clock cycles respectively.

The 6-bit up-counter counts a number of pulses from the output (B) of the NOR gate 540 to assist in determining pulse width. The output of the 6-bit up-counter 534 is provided through connection 542 to mapper/decoder 544. The mapper/decoder 544 provides an output based upon the count received from the 6-bit up-counter 542. The mapper/decoder 544 has an RSD output representing the recovered serial data from the single wire connection (logical "1" or "0" bit), a GLH output representing a glitch signal indication over the single wire input, a BRK output indicating a break indicator received over the single wire input and an SLP output indicating a sleep indicator received over the single wire connection. Each of these outputs is connected to respective D-input of associated D flip-flops 546, 548, 550, and 552.

The mapper/decoder 544 works as follows: If the output of the 6-bit up-counter equals 1-3 the GLH output equals 1 and the other outputs equal 0. If the output of the 6-bit up-counter equals 4-11 the RSD output equals 1 and the other outputs equal 0. If the output of the 6-bit up-counter equals 12-21 the RSD output equals 0 and the other outputs equal 0. If the output of the 6-bit up-counter equals 22-63 the BRK output equals 1 and the other outputs equal 0. If the output of the 6-bit up-counter is greater than 63 the SLP output equals 1 and the other outputs equal 0. Clock inputs of each of the flip-flops 546, 548, 550 and 552 are connected to the Q-output of flip-flop 536. The Q-output of 536 and the QB output of flip-flop 538 are connected to the inputs of NAND gate 554. The output of NAND gate 554 represents the recovered serial clock signal (RSCK).

The recovered serial data provided from the outputs of D flip-flops 546, 548, 550 and 552 is in NRZ format, and the recovered serial clock from NAND gate 534 are output to a serial-to-parallel shift register 556 for instruction/data decoding. The shift register 556 clocks the serial data RSDI on the falling edge of the recovered clock signal RSCK. The clocked recovered serial data is output to a parallel data bus 558 for interface with the central processing unit 522. The recovered serial clock is synchronized with the recovered serial data by determining the correct phase of the provided high speed reference clock (RFCK) on the device. Thus there is provided a multi-phase digital clock recovery system that Readjusts its clock output phase after every received data bit. RSCK is also used to increment a bit counter 559 for tracking the number of bits received in the instruction/data frames.

Figure 5B:
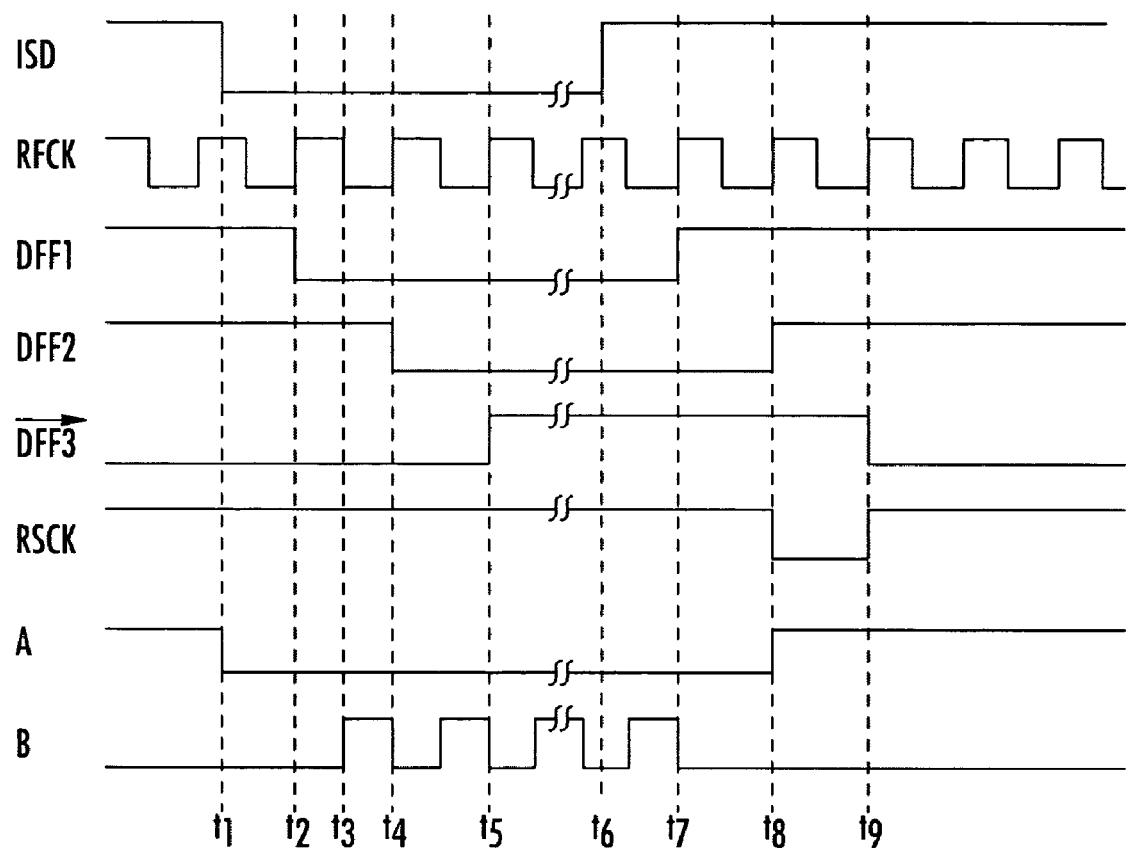
FIG. 5b is a timing diagram for the clock/data recovery circuit.

Referring now to FIG. 5b, there is illustrated a timing diagram for the clock/data recovery circuit 515 discussed with respect to FIG. 5a. Input ISD represents the received serial data that is transmitted over the single wire connection. The reference clock (RFCK) is the clock signal provided by the clock circuit 526 within the receiving device. Signal DFF 1 represents the output of the D flip-flop 530. Signal DFF2 represents the output of D flip-flop 536. Signal $\overline{DFF3}$ represents the output QB of the D flip-flop 536. Signal RSCK comprises the recovered clock. Signal A represents the output of AND gate 532, and signal B represents the output of the NOR gate 540.

The received serial data ISD goes low at time $t_1$, this being the "start bit." At this point there are no other changes of the signals within the clock/signal recovery circuit 515. At time $t_2$ on the next rising clock signal after the ISD signal has gone low, the output DFF 1 of the D flip-flop 530 goes low. This is in response to the low ISD signal applied to one input of the D flip-flop 530 and the rising edge of the reference clock RFDK on the other input. At time $t_3$, the output B of the NOR gate 540 begins outputting clock pulses to be counted by the six bit up-counter 534. These clock pulses are gated to the output of the NOR gate 540 responsive to the low output of DFF1 and the falling clock edges of the reference clock RFCK. At time $t_4$ responsive to the next rising edge of the reference clock (RFCK), the output DFF2 of the D flip-flop 536 goes low. This is responsive to the low signal applied to the input of the flip-flop 536 and the rising clock edge of signal RFCK. One clock cycle later at $t_5$ on the next rising edge of clock signal (RFCK), the QB output ($\overline{DFF3}$) of D flip-flop 538 will go high. This is in response to the low clock signal applied to the input of flip-flop 538, and the rising clock edge of RFCK.

The next event occurs at time $t_6$ wherein the input serial data signal goes from low to high, this being the "stop bit." On the next rising clock edge of the reference clock signal RFCK at $t_7$, the output of D flip-flop 530 will return high responsive to the high input from the ISD signal applied to one input and the rising edge of the clock on the other input. Time period $t_7$ also marks the end of the pulses produced on the B output of NOR gate 540. The output of D flip-flop 536 goes high at $t_8$ responsive to the high input applied at the input of D flip-flop 536 and a rising clock edge from the RFCK signal. Additionally, a low pulse is generated on the recovered signal clock output responsive to the high inputs provided to both inputs of the NAND gate 554 from the outputs of D flip-flop 536 and D flip-flop 538, respectively. Finally, at time period $t_9$, the output of D flip-flop 538 goes low responsive to the high input from D flip-flop 536 and the rising clock edge from the reference clock RFCK. In response to the output of D flip-flop 538 going low, the recovered clock signal returns high. This rising edge at $t_9$ loads data to the register 556.

Figure 5C:
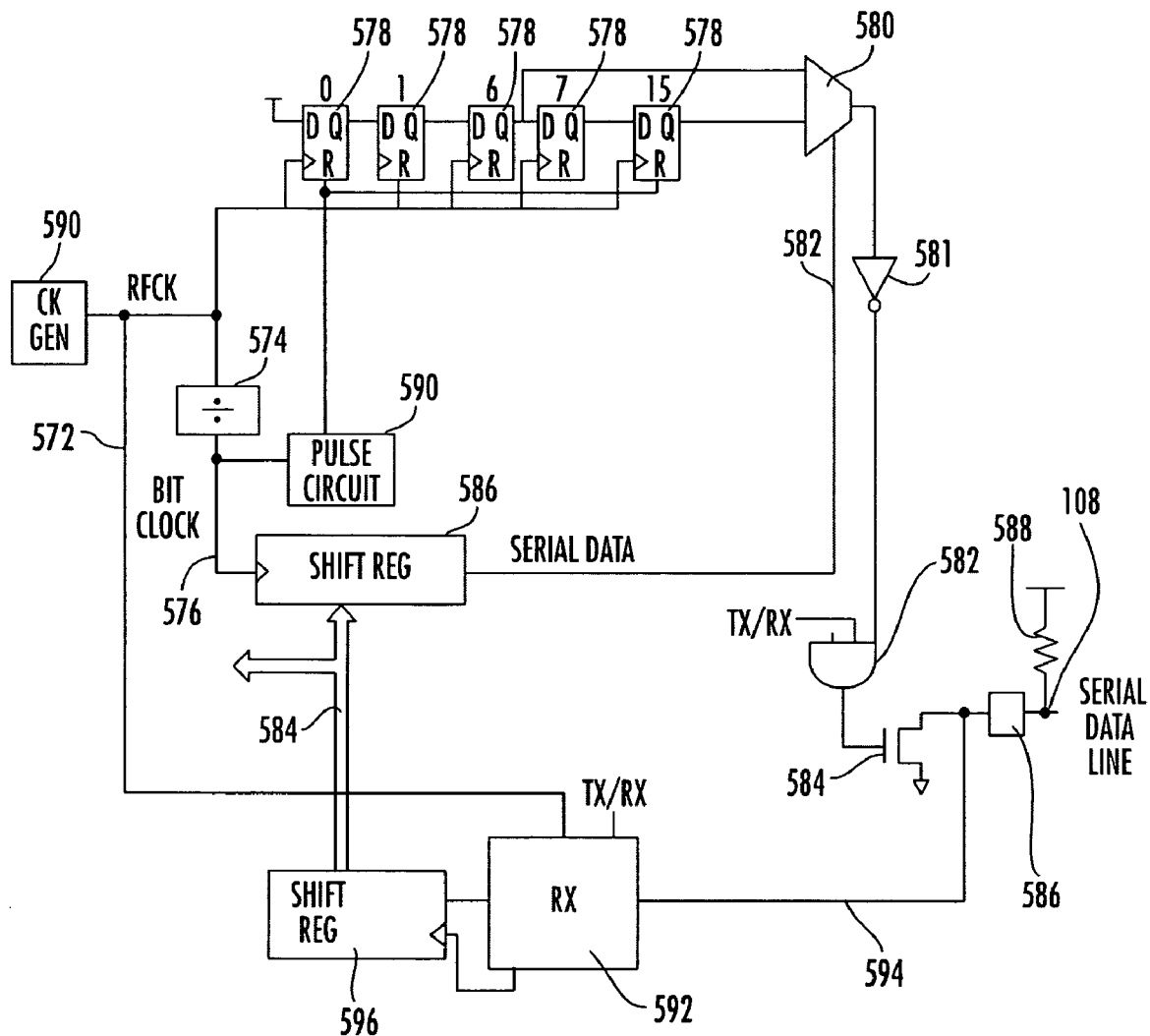
FIG. 5c is a transmitter circuit.

Referring now to FIG. 5c, there is illustrated a representative circuit diagram of the transmit portion of any of the nodes. As noted herein above, each node will be provided with the ability to transmit a byte of data to a receiving one thereof. The host device 102 is, in default mode, in a transmit mode, whereas each of the slave devices 104 and 106 are in the receive mode by default. As such, the host device 102 has control of the bus initially. However, it should be noted that the receive and transmit circuitry can be substantially identical for both circuitry or, alternatively, it could be much more complicated. For example, in a slave device, more simplified circuitry would be utilized to lower cost and size. The host functionality could, by design, be facilitated with a very high powered processor based integrated circuit or computer system.

Referring further to FIG. 5c, a transmitter for the node on the network will be described. There is provided on the node device a clock generator 570. This clock generator can be dedicated to transmitting of data and receiving of data or it can be the general timing reference on the integrated circuit associated therewith. This clock generator will generate at a time base which is typically 23*bit time such that there will be 23 pulses of the reference clock RFCK for each data bit transmitted. This is output on a node 572. This is divided down by a divider 574 to output on a node 576 of the bit clock. For the transmit operation, it is necessary to pull down the output for seven of the RFCK clock for a logic "1" and to pull it down for sixteen of the RFCK clock cycles for a logic "0." A representative circuit for this is a plurality of D-type flip-flops 578, which are arranged in series such that the Q-output thereof is connected to the D-input of the next one thereof, the D-input of the first one thereof connected to a positive voltage with the clock input thereof clocked by RFCK on node 572 and a reset input operable to reset the circuit for each bit clock cycle. The D flip-flops 578 are arranged such that the output of the seventh one thereof is connected to one input of a multiplexer 580, the other input to the multiplexer 580 connected to the Q-output of the sixteenth flip-flop 578. Therefore, after reset on the rising edge of the bit clock, all of the Q-outputs thereof will be low for one clock cycle. After seven clock cycles, the output of the seventh flip-flop 578 will go high and, after the sixteenth clock cycle, the output of the sixteenth flip-flop 578 will go high. The multiplexer 580 selects either of the two inputs based upon the logic state of the data, which is received as an enable signal on a control line 582. The output of the multiplexer 580 is connected to one input of a gate 582 through an inverter 581, the other input thereof connected to a transmit/receive control signal such that, upon transmit, the gate 582 will control the gate of an open-drain n-channel transistor 584 to pull an output terminal 586 to ground, which terminal 586 is connected to a serial data line 108. As noted herein above, there is provided a pull up resistor 588 as the passive load, such that when the gate of transistor 584 is high, terminal 586 will be pulled low and, when the gate of transistor 584 is low, the resistor 588 will pull the data line 108 high.

The data is received on a parallel data bus 584, which allows data to be input to a shift register 586 which is a parallel-to-serial shift register. This allows parallel data to be input thereto at the width of the bus 584 and shifted out by the bit clock on node 576. Thus, for each rising edge of the bit clock, the data associated with that bit will be output on the control line 582. The reset pulse is generated off the rising edge of the bit clock on node 578 with a pulse circuit 590.

The receive operation, which is part of the overall TX/RX blocks is provided by a receive block 592, which is operable to interface with the voltage level on the terminal 586 through a line 594 to allow detection of the signal thereon as described herein above, then output this to a serial-to-parallel shift register 596 which is clocked by the recovered clock for output on the data bus 584. The receive block 522 is controlled by the TX/RX signal such that, when it is in the receive mode, it will receive data and output it to the bus 584 and, when it is in the transmit mode, the receive block 592 will be inhibited from inputting data or latching data to the bus 584.

Figure 5D:
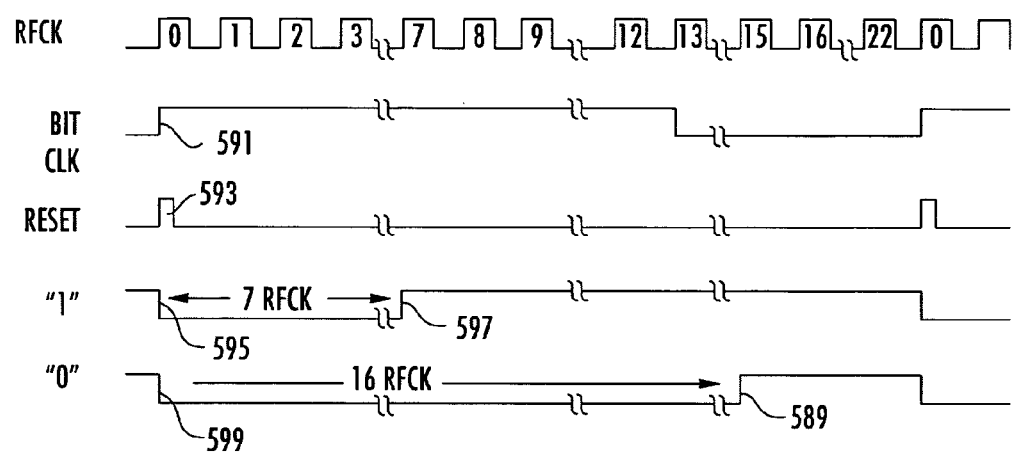
FIG. 5d is a timing diagram for the transmit operation.

Referring now to FIG. 5d, there is illustrated a timing diagram for the transmit operation. The RFCK signal, as described herein above, is related to the bit clocks such that 23 cycles thereof are required for each bit time. When the bit clock goes high at a rising edge 591, a reset pulse 593 will also be generated for resetting all of the flip-flops 578. For a "1" operation, the output will be pulled low at a falling edge 595 for seven of the RFCK clock cycles, at which time it will go high at a rising edge 597. It will remain high for the rest of the bit clock period. For a "0," the serial data line 108 will be pulled low at a falling edge 599 and will remain low for sixteen RFCK cycles until a rising edge 589 at the sixteenth one of the clock cycles from the falling edge 599. The serial data line 108 will remain high until the end of the bit clock cycle when another data bit is to be transmitted. Thus, it can be seen that the transmitted bit clock will be referenced to the rising edge 597 for the transmission of a logical "1" or to the rising edge 589 for the transmission of a logical "0" bit. At the receive side, the bit is determined at the end of the rising edge 597 and then shifted into the shift register at the receiving device with this edge 597 synchronized to the reference clock at the receiving device. Thus, the recovered receive clock will have a pulse substantially time positioned with respect to either of the rising edges 597 or 589. However, the shift register at the receiving device could have data loaded therein at the falling edge of the next data to be received. This, however, is not important, since each bit is transmitted independent of the other bits and it is not necessary to recover the bit clock for other than a single bit.

Figure 6:
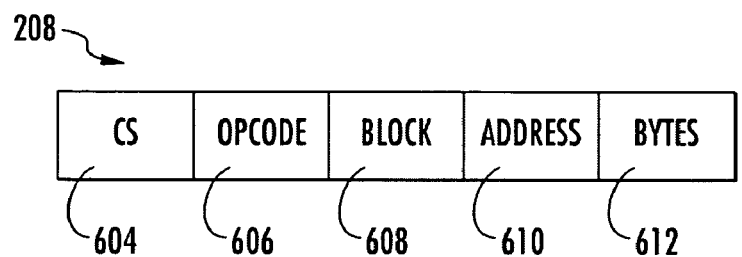
FIG. 6 is a block diagram of the access instruction transmitted from the host device to initiate communication over a single wire between a host device and a slave device.

Referring now to FIG. 6, there is illustrated the 16-bit access instruction 208 for initiating a data transfer operation between the host device 510 and slave device 512. The chip select field 604 is a 1-bit address code preprogrammed into a slave device's EEPROM memory and may be reprogrammed as necessary. If the chip select code 604 in the control access instruction 208 does not match a slave device's hard wired access code, instructions in any subsequent packets received from the host device 510 will be ignored until a break command is received. A chip select "0" bit provides for battery protection or an external battery security device. A chip select "1" bit provides an indication of a fuel gauging device. This allows for selection between two devices. The OP code field 606 is a 2-bit field provides an indication of the operation to be performed. These fields are directed toward the functionality embedded within the slave device.

The "01" OP code indicates a normal Read operation providing that data should be read from the slave device 512 into the host device 510, i.e., transmitted from the slave to the host. The "10" OP code indicates a Read operation with CRC providing for a Read from the slave register, but includes a one byte CRC appended to the end of the last Read packet from the slave device 510. The "00" OP code indicates a Write operation and provides that data should be written to the slave device 512 from the host device 510, this being a receive operation at the slave. The "11" OP code indicates a first capture trigger that provides a trigger of a voltage A/D measurement and a Read operation from the indicated device register once the triggered conversion is completed. To disable the auto read-back function, the field 608 may be set to "10".

Figure 6A:
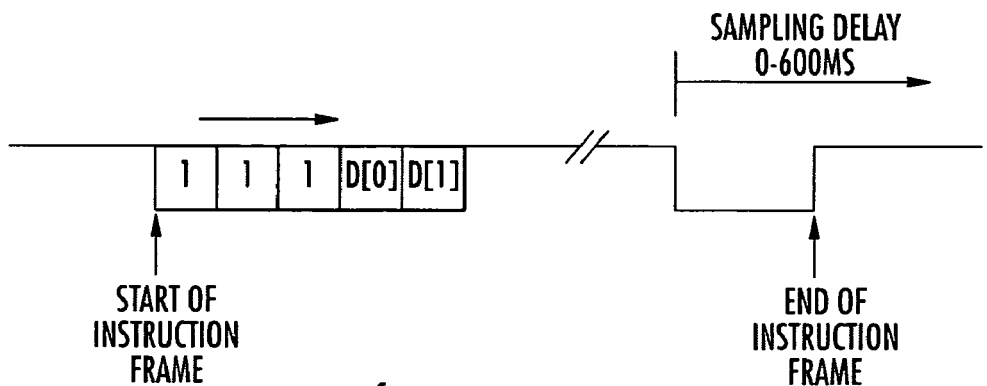
FIG. 6a illustrates the format of an instruction frame containing an OP code.

When the special purpose OP code "11" is detected, the format of the instruction frame containing the OP code is redefined as illustrated in FIG. 6a. D[0] and D[1] are the sampling delay fields which are defined such that "00" indicates no sampling delay, "01" indicates a 200 microsecond sampling delay, "10" indicates a 400 microsecond sampling delay and "11" indicates a 600 microsecond sampling delay.

The block field 608 is a two bit field indicating where the provided data is to be written. A block code "00" indicates that the data should be written to the EEPROM memory. A "01" block code indicates that data should be written to control, status and data registers. A "10" block code indicates that data should be written to the device authentication registers, and a "11" block code indicates that data should be written to the test registers. Writing to the EEPROM memory may only occur one byte at a time. Device authentication registers can be locked out. Once the device authentication registers are locked, no Read/Write access to this register is possible. Furthermore, once the device authentication registers are locked, they cannot be unlocked.

The address field 610 is an 8 bit long field indicating the starting address of a register Read or Write sequence.

The bytes field 612 indicates the number of data bytes to be read or written during the Read or Write operation. The number of bytes does not include the CRC byte, if any. The bytes field 612 is three bits long. Thus, a total of 16 bytes may be indicated in the three bit field. If the byte field 612 reads "0h" (hexadecimal) this indicates that zero bytes will be following and is used for instructions which do not require data. If the byte field 612 reads "1h" (hexadecimal) this indicates one byte of data will be following. When the byte field reads "2h" (hexadecimal) this indicates that two bytes of data will be following and is used for Read operations from or Write operations to multi-byte result registers. When the byte field Reads "3h" (hexadecimal) this indicates that three bytes of data will be following and is used such that wide registers will be strobed simultaneously. An indication in the byte field 612 of "4h" (hexadecimal) indicates four bytes of data will be following and is used for multi-byte serial Read or Write processes. If the byte field reads either "5h" (hexadecimal) or "6h" (hexadecimal) this is an invalid selection and causes the device to output a break command. A byte field 612 indication of "7h" (hexadecimal) indicates that 16 bytes of data will be following and is used only for reading from or writing to the EEPROM memory.

Referring now to FIGS. 7a-7c, there is illustrated the bus transaction protocol for multi-byte Write operations, multi-byte Read operations, and back-to-back transactions (wherein a Read is followed by a Write.) In the multi-byte Write transaction illustrated in FIG. 7a, the Write frame instruction 702 is followed by the host inner frame gap (IFG$_H$) 704 which is followed by first and second data frames 706 and 708, also separated by a host inner frame gap 710.

The multi-byte Read operation illustrated in FIG. 7b illustrates the Read instruction frame 712 separated by the device turnaround time (TA$_D$) 714 from a first data frame 718, which is separated from the second data frame 716 by the device inner frame gap (IFG$_D$) 720.

The Read operation followed by a Write operation illustrated in FIG. 7c, illustrates the Read frame operation 722 separated by the device turnaround time (TA$_D$) 724 from the data frame 726. The data frame 726 is separated from the next instruction frame 728 by the host turnaround time (TA$_A$) 730. The next instruction frame 728 would comprise the Write operation.

Figure 8:
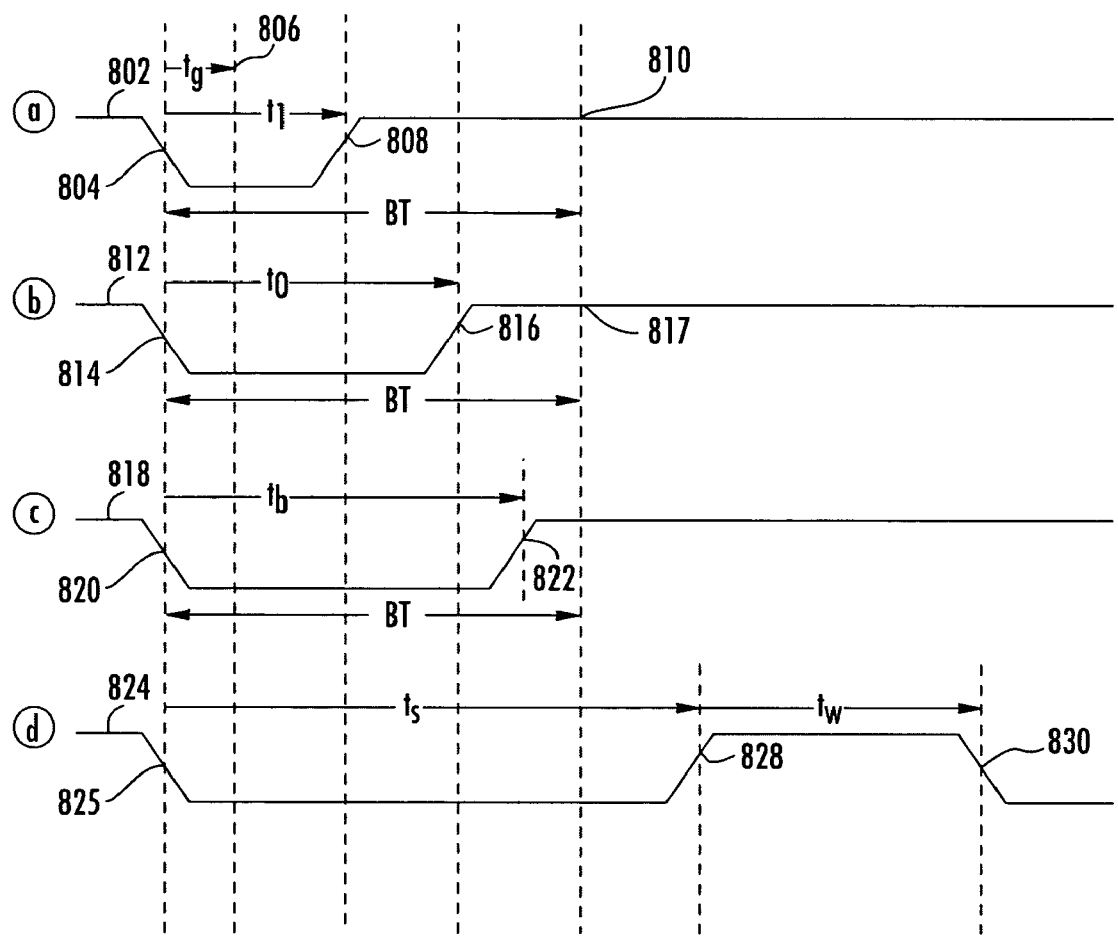
FIGS. 8a-8d are timing diagrams illustrating the manner in which logical data may be transmitted between a host device and a slave device utilizing predetermined pulse widths.

Referring now also to FIGS. 8a-8d, there are illustrated the manner in which various logical data may be transmitted between the host device 510 and the slave device 512. FIG. 8a illustrates the manner in which a logical "1" may be transmitted. The voltage level on line 514 is initially held high at 802 by the passive load as described previously. At falling edge 804, the voltage level is pulled low indicating the start of a data transfer operation, i.e., a "start bit." The voltage signal on line 514 will remain low for a predetermined period of time depending on whether a "1" bit or a "0" bit of information is being transferred. As shown in FIG. 8a, the signal must be held low for at least a period of time (tg) beginning at falling edge 804 and passing to a point 806 for any logic state of data. A pulse width less than tg will result in a packet error. The time periods given below include the variable x, wherein x comprises a selectable bus speed of 2.89 KHz (x=0.5), 5.78 KHz (X=1), 11.56 KHz (x=2), and 23.12 KHz (x=4). In the preferred embodiment, the length of tg is 22/x microseconds. When the voltage signal is driven back high at rising edge 808 within a time period denoted by t1 this indicates the transmission of a logical "1" bit, noting that the positive transition 808 indicates the "stop bit" or termination of data transmission for that single bit. In the preferred embodiment, the point at which the voltage signal may be driven high to indicate a logical "1" can fall within a range of 53.9/x-73.2/x microseconds for the host device and 51.3/x-53.9/x microseconds for the slave device. Finally, it is noted that FIG. 8a illustrates the width of the bit period designated BT for "bit time." The bit period runs from the falling pulse edge 804 to point 810. In the preferred embodiment this bit period is approximately 172.8/x microseconds. This is the time period during which the pulse indicating the "1" bit or "0" bit must be transmitted.

Referring now to FIG. 8b, there is illustrated the transmission of a logical "0" bit according to the method of the present disclosure. Initially, the voltage level on line 514 is held high at 812. The signal is driven low at falling edge 814 by the device transmitting data. The voltage level is held low until a rising edge 816. The time period between falling edge 814 and rising edge 816 indicates a logical "0" pulse width t0. In one embodiment, the logical "0" pulse width must be held between 107.8/x-131.8/x microseconds for the host device and 117.2/x-123.2/x microseconds for the slave device. Thus, the rising clock edge 816 of the logical "0" pulse is somewhere within this range. As with respect to FIG. 8a, the bit period BT is the time in which the entire pulse representing the "0" logical data bit must be transmitted and lies between the falling clock edge 814 and point 817.

Referring now to FIG. 8c, there is illustrated additional data which may be transmitted within the pulse widths over line 514 in addition to the logical "0" and logical "1" discussed with respect to FIGS. 8a and 8b. A break command may be indicated to the receiving unit by providing a pulse width that exceeds that of both the logical "1" bit and logical "0" bit. As shown in FIG. 8c, the voltage level on output line 514 is initially held high at point 818. From a falling clock edge 820, the break time (tb) holds the pulse width low until a rising clock edge 822. In the disclosed embodiment, the rising clock edge 822 for the break command may be provided anywhere in a range from 0.17/x-1 milliseconds for the host device and 181.3/x-192.5/x microseconds for the slave device. The break code is an indication provided by the slave device 112 indicating that it is unable to perform an instruction provided by the host due to a bus error or EEPROM access during a EEPROM Write operation.

Referring now to FIG. 8d, there is illustrated the manner in which the slave or host devices may be placed in a shelf sleep mode. In this case, the voltage level is initially held high at a point 824 and then actively driven low at falling edge 825. The pulse remains at a low voltage level until released and passively pulled high at rising edge 828. The sleep time pulse width (ts) in the disclosed embodiment is at least 200 milliseconds long. This places the receiving device in the shelf sleep mode. Once the device is in the shelf sleep mode, a wake time pulse having a width (tw) may be provided by maintaining the voltage level on line 514 at a high level for a sufficient period of time between rising edge 828 and a falling edge 830. In the preferred embodiment, the wake time pulse width (tw) will be at least one millisecond.

Figure 9:
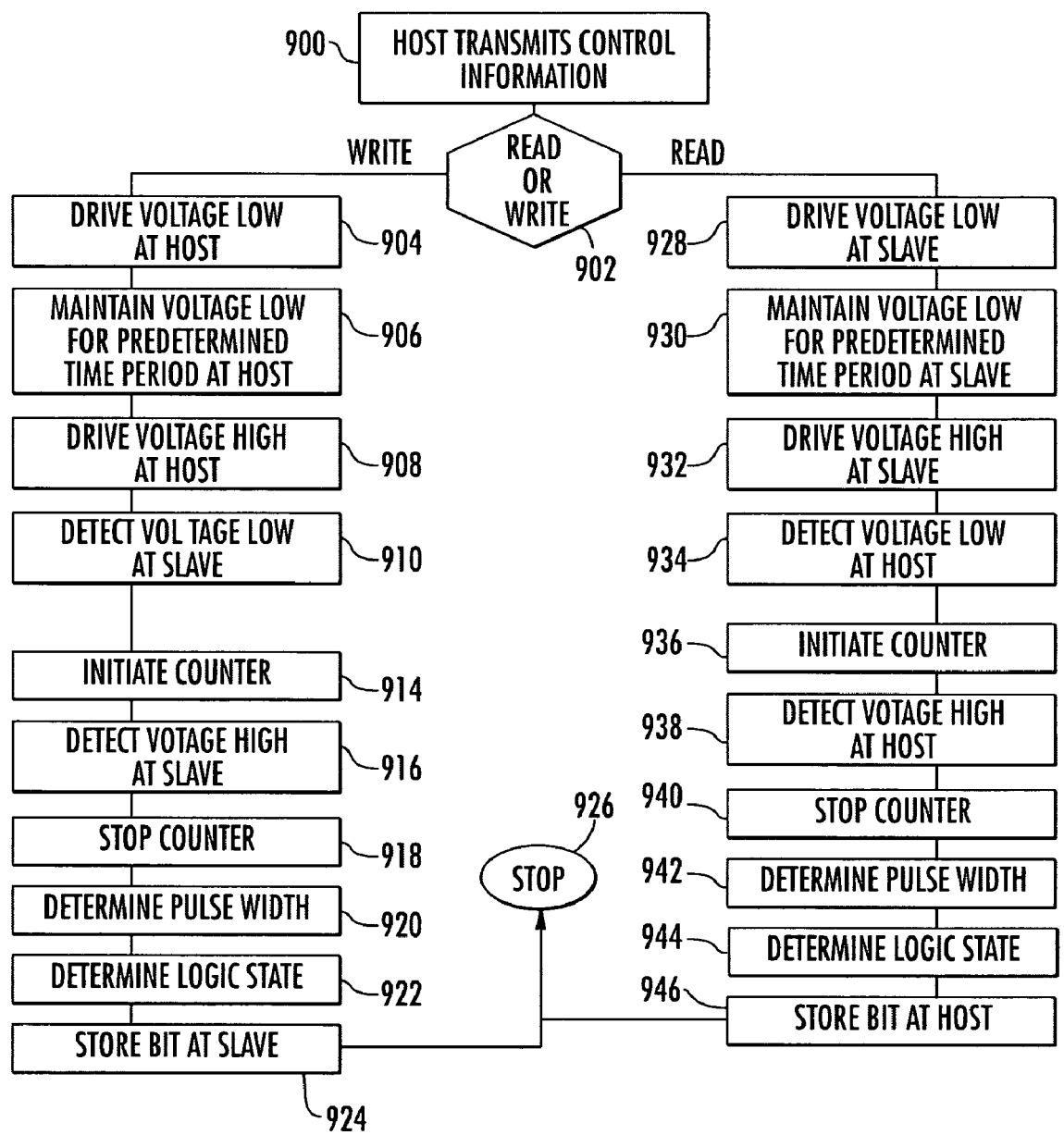
FIG. 9 is a flow diagram illustrating a data transfer operation between a host device and a slave device according to the method of the present disclosure.

Referring now to FIG. 9, there is illustrated a flow diagram describing the operation of the pseudo-synchronous single wire bidirectional interface of the present disclosure. Initially, at step 900 the host device 510 transmits the 16-bit instruction packet to the slave device 512 containing all control information for the present operation. Inquiry step 902 determines whether the control information indicates that the operation is a Write operation or Read operation. If the control information illustrates a Write operation is to be performed, the host drives, at step 904, the voltage level low on line 514. This provides an indication of the start of the transmission of a logical "1" or "0" data bit. The voltage level is maintained at a low level at step 906 for a predetermined period of time by the host based upon whether a logical "0" or logical "1" is being transmitted. When the predetermined time period associated with the logical "0" or logical "1" has expired, the host drives the voltage level high at step 908, indicating the completion of bit transmission. The pulse generated at the host is transmitted along the single line 514 until it reaches the slave device 512.

The slave device 512 detects the voltage low level indicating the beginning of a transmission pulse at step 910. In response to the detection of the falling pulse edge at step 410, the slave device 512 initiates, at step 914, a counter to assist in measuring the width of the pulse which is about to be received. The slave device 512 next detects at step 916 the voltage level going high on line 514. In response to the rising pulse edge on line 514, the slave device 512 will stop, at step 918, the counter initiated at step 914.

Using the information stored within the counter, the CPU 522 within the slave device 512 determines at step 920 the width of the pulse transmitted from the host device 510. The determined pulse width is used at step 922 to determine whether a logical "1" or "0" bit was transmitted. The determined bit is stored at the slave device at step 924 in a register for later storage at the location indicated by the block field 306 and address field 308 of the instruction packet 300, when the entire byte is received. The process ends at step 926.

If inquiry step 902 determines that a Read operation is to be performed by the host device 510, the slave device 512 then controls the data transmission operation and drives the voltage level on line 514 low at step 928. The slave device 512 maintains, at step 930, the voltage level low for a predetermined period of time associated with whether a logical "1" or "0" bit is being transmitted from the slave device 512 to the host device 510. Once the predetermined period has expired, the slave device 512 will drive the voltage level high at step 932 indicating the end of the transmitted logical data bit.

In response to the falling clock edge, the host device 510 will initiate a counter at step 936 to assist in measuring the width of the pulse about to be received, this counter synchronized to the host clock and not the slave clock. At step 938, the host device 510 will detect the voltage level on line 514 going high. In response to the rising edge of the pulse, the host 510 will stop the counter at step 940. The CPU 522 within the host device 110 utilizes the information within the counter to determine at step 942 the width of the pulse. Using the width of the pulse, a logical "1" or logical "0" state is then determined at step 944. The logical bit determined at step 944 is stored at the host device 510 at step 946 in a register for later storage in the location indicated by the block and address fields (306, 308) provided within the instruction packet 300, when the entire byte is received. The process ends at step 926.

Figure 10:
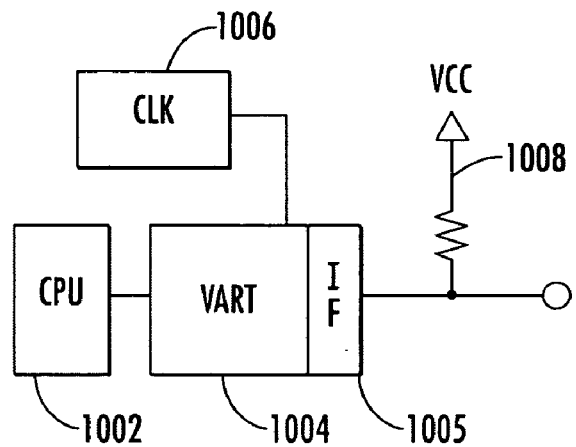
FIG. 10 is a block diagram of a UART circuit configured to operate using the single wire bus interface of the present disclosure.

Referring now to FIG. 10, there is illustrated an implementation of the pseudo-synchronous single wire communications protocol of the present disclosure using a UART 1004. The UART 1004 is interconnected with a CPU 1002 via a conventional UART interface. The other side of the UART 1004 includes an interface 1005 operating according to the single wire communications system described herein above. The UART acts as a translator between the conventional UART protocol and the single wire protocol of the present system. The interface 1005 within the UART has an open drain output with the external pull-up resistor 1008. A clock 1006 providing a stable clock is also connected to the UART 1004. The external pull-up resistor 1008 is scaled for the provided bus rate and load capacitance in accordance with the following chart.

| Single Wire Bus Rate | UART Baud Rate | Reference Clock (MHz) | UART Divisor Setting | Pull-up Resistor (kΩ @ 10 pF) |
| --- | --- | --- | --- | --- |
| x = 0 . . . 5 | 28.8 k | 1.8432 | 4 | 1000 |
| x = 1 | 57.6 k | 1.8432 | 2 | 500 |
| x = 2 | 115.2 k | 1.8432 | 1 | 250 |
| x = 4 | 230.4 k | 3.6864 | 1 | 125 |

When UART 1004 transmits a logical "1," the interface 1005 will output the 8-bit sequence "00111111." When the UART 1004 outputs a logical "0," the interface 1005 will output the 8-bit sequence "00000011." The UART 1004 recognizes a received logical "1" bit when receiving one of four 8-bit combinations through the interface 1005. These 8-bit combinations include "01111111," "00111111," "00011111," and "00001111." Likewise, the receipt of a logical "0" bit is indicated by the receipt of four 8-bit sequences. The receive bit sequences for a logical "0" include "00001111," "00000011," "00000001," and "00000000." Any other received combination of a 8-bits provides an indication of a receive error.

Figure 11:
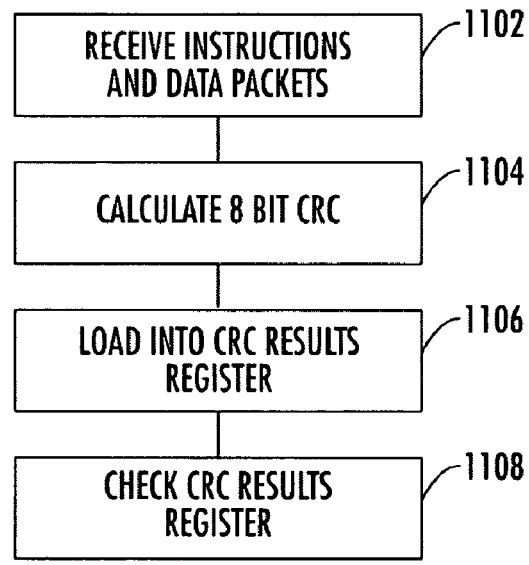
FIG. 11 is a flow diagram describing a passive CRC process for including CRC with Write data.
Figure 12:
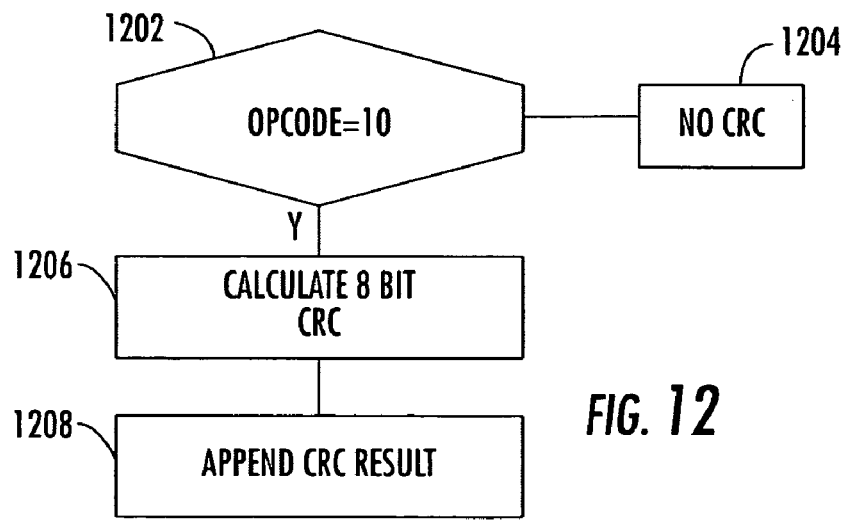
FIG. 12 is a flow diagram illustrating a passive CRC process for Read data.

Referring now to FIGS. 11 and 12, there are illustrated the manner in which a passive cyclic redundancy check (CRC) may be performed on data transmitted over the single pseudo-synchronous single wire communications bus of the present disclosure. FIG. 11 illustrates the use of CRC with respect to Write data. The slave device 512 will first receive the instruction and data packets at step 1102. From the instructions and data packets, the slave device 512 will calculate an 8-bit CRC at step 1104. The resulting CRC results are loaded into the CRC result register at step 1106. The host device 510 examines, at step 1108, the CRC results within the CRC result register to determine if rewriting to the slave device 512 is necessary.

Referring specifically to FIG. 12, there is illustrated the CRC operation with respect to Read data. When inquiry step 1202 determines that the OP code from the instruction command equals "10," an 8-bit CRC is automatically calculated, at step 1206, for the data bytes being transferred out of the slave device 512. The CRC result is appended, at step 1208, to the last data byte being transferred out of the slave device 512. If no OP code is determined by inquiry step 1202, no CRC bits are appended at step 1204.

Figure 13:
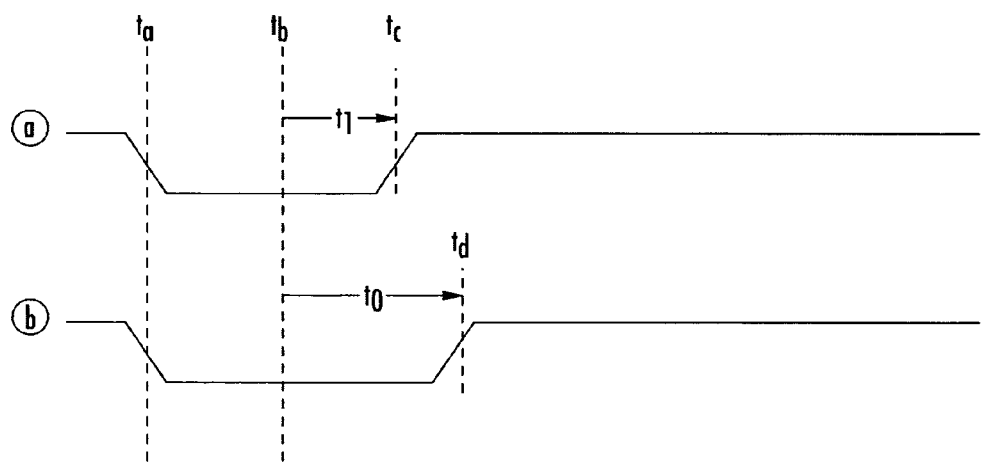
FIG. 13 is a timing diagram illustrating an alternative embodiment for transmitting logical data utilizing pulse width according to the present disclosure.

Referring now to FIG. 13, there is illustrated an alternative manner for utilizing the pulse length to determine the transmission of a logical "1" or logical "0" over the single wire connection between the host device 510 and the slave device 512 during a Read operation. In signal A, the host device 510 drives the signal on the single wire low at point $t_a$. The host maintains the line low for a select period of time until point $t_b$. At point $t_b$, the host device 510 releases control of the signal on the single wire connection to enable it to go back high. Since this is a Read operation, the slave device 512 begins maintaining the line low at some point before or beginning at time $t_b$. If the slave device maintains the signal low upon the single wire connection for a time $t_1$ until point $t_c$, this provides an indication of the transmission of a logical "1" bit. If the slave device 512 maintains the line low for a period to from point $t_b$ to point $t_d$ this provides an indication of the transmission of a logical "0" bit. Thus, in order to determine the transmission of the logical "1" or logical "0" bit, the pulse length must only be measured from point $t_b$ to point $t_c$ or point td rather than beginning at point $t_a$. This would provide some notice of measurement of the clock pulse, since the driving down of the signal on the transmission line at point $t_a$ would provide notice of measurements of the pulse widths beginning at point $t_b$ for the Read operation.

Single wire communications may find many uses in the electronics device industry. One situation in which a single wire communication would be particularly valuable is in the battery authentication field. A manufacturer may produce an electronic device, such as a cellular telephone, that is configured to operate with a particular battery type having characteristics that optimize the functionality of the electronic device. One way to assure that the appropriate battery is being utilized with the electronic device is to provide some type of communication between the electronic device and the battery such that the battery may be authorized by the electronic device.

Figure 14:
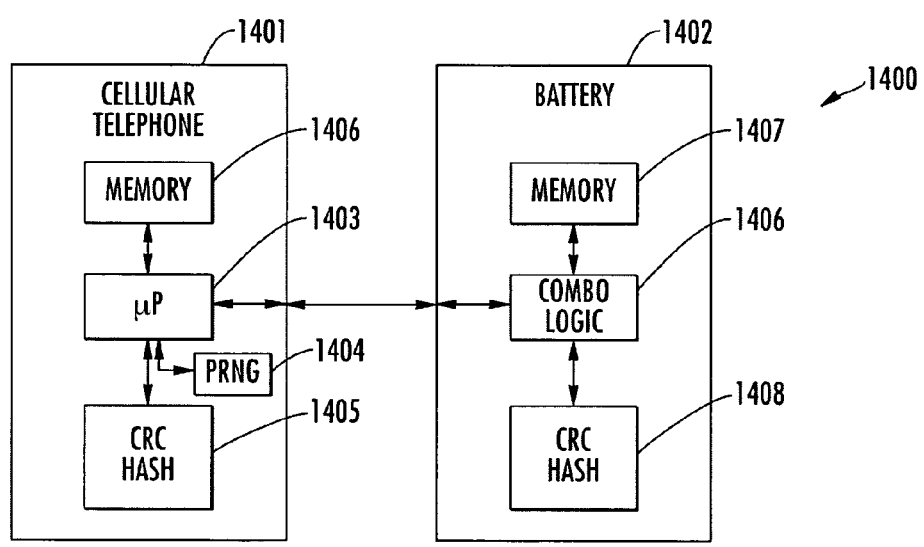
FIG. 14 is a functional block diagram of a battery authentication system.

Referring now to FIG. 14, there is illustrated a functional block diagram of a battery authentication system. While the following battery authentication technique is described with respect to a cellular telephone, it should be realized by one skilled in the art that any electronic device needing a battery to operate may be configured in a similar manner. The CRC battery authentication system 1400 includes a cellular telephone 1401 and a battery 1402. The cellular telephone includes a processor 1403. The processor 1403 may be connected to associated memory, typically a RAM memory chip or other suitable memory device. The processor 1403 may be connected to a pseudo-random number generator (PRNG) 1404 and a CRC hash circuit 1405. Those skilled in the art may recognize that the PRNG 1404 and the CRC hash circuit 1405 may be implemented in software executed on the processor. The implementation chosen will depend on the type, functions and limitations of the cellular telephone.

The battery 1402 includes a processor 1406. The processor 106 is connected to a memory 1407. In accordance with one embodiment, the memory 1407 may be an electrically-erasable, programmable Read-only memory (EEPROM). The processor 1406 is connected to a CRC hash circuit 1408. Those skilled in the art will recognize that the CRC hash circuit 1408 may be implemented in software executed on the processor 1406. The battery 1402 is configured without a processor 1406, such that the CRC hash circuit 1408 is configured to respond to inputs from the cellular telephone 1401 and is connected to the memory 1407.

Figure 15:
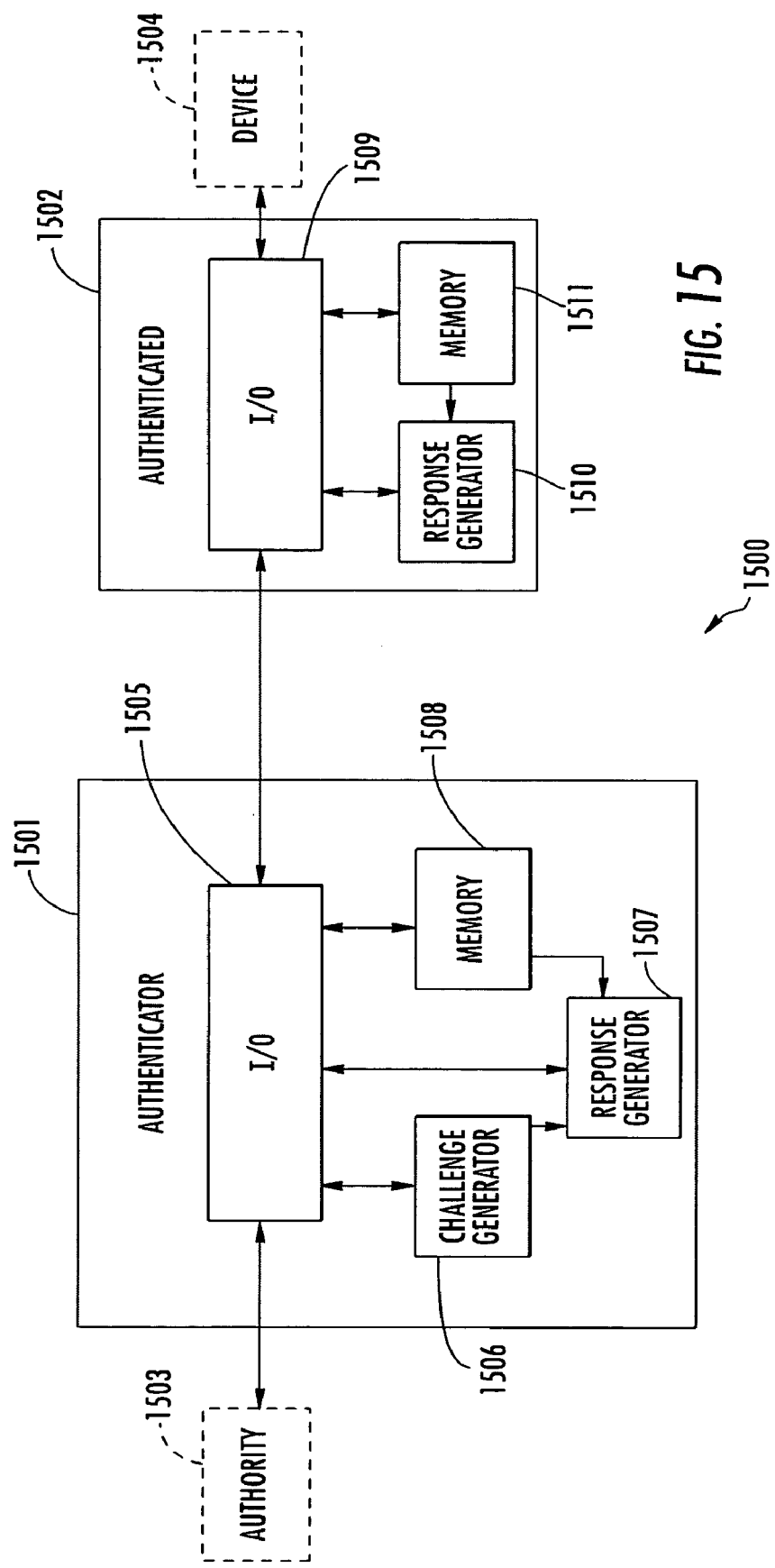
FIG. 15 illustrates a functional block diagram of a challenge-response authentication system.

With reference to FIG. 15, a functional block diagram of a challenge-response authentication system 1500 is shown. The challenge-response authentication system 1500 includes an authenticator unit 1501 communicatively connected with an authenticated unit 1502. Typically, the authenticator unit 1501 may be connected to or integral with an authority 1503. The authenticated unit 1502 may be connected to or integral with a device 1504. In some embodiments, the authenticator unit 1501 may be sufficient without an authority 1503. In some embodiments, the authenticated unit 1502 may be sufficient without a device 1504, particularly where the authenticated unit 1502 is used to authenticate possession of the authenticated unit 1502 as a token or key.

The authority 1503 may be a system or resource that the device 1504 may be communicably connected to if the device 1504 is successfully authenticated to the authority 1503. In accordance with the disclosed embodiment, the authority 1503 IS a cellular telephone and the device 1504 is a cellular telephone battery. The authority 1503 may also be a computer network and the device 1504 may also be a computer. The authority 1503 may be a lock and the device 1504 or the authenticated unit may be a key.

In accordance with an embodiment, authenticator units 1501 and authenticated units 1502 may be distributed in pairs, allowing mutual authentication. These pair-distributed authenticator units 1501 and authenticated units 1502 may share resources or be implemented independently, depending on the specific security concerns of the embodiment. Because of the functional redundancies within the units, an authenticator unit 1501 can substantially function as an authenticated unit 1502 when such a configuration provides sufficient authentication security.

The authenticator unit 1501 and authenticated unit 1502 are depicted as containing functional elements. These functional elements may be implemented in software executed on a microprocessor, in one or more integrated circuits, discrete circuits or as a combination of software and hardware. For ease of discussion, these functional elements will be treated as though they were implemented independently of each other and communicably connected, although an actual implementation of the elements will typically vary from the described embodiment.

The authenticator unit 1501 may include an authenticator I/O element 1505, a challenge generator 1506, an authenticator response generator 1507 and an authenticator memory 1508. In accordance with the disclosed embodiment, the authenticator I/O element 1505 is connected to an authority 1503, an authenticated unit 1502, a challenge generator 1506, an authenticator response generator 1507 and an authenticator memory 1508. The authenticator response generator 1507 may be connected directly to the challenge generator 1506 and the authenticator memory 1508, or may be connected to those elements through the authenticator I/O element 1505.

The authenticator unit 1501 may include an authenticator I/O element 1505. The authenticator I/O element 1505 may control communication between the elements of the authenticator unit 1501, the authenticated unit 1502 and the authority 1503. The authenticator I/O element 1505 may include passive connection elements including one or more ports, jacks, wire connectors or other passive connection elements. The authenticator I/O element 1505 may include active connection elements including processors, transmitters, receivers, modulators, demodulators, logic circuits, or other active connection elements. The authenticator I/O element 105 may include software connection elements to control the processing, transmission and reception of the communications.

The authenticator unit 1501 may include a challenge generator 1506. The challenge generator 1506 may provide a sequence of bits for use as a challenge in the challenge-response authentication. The challenge generator 1506 may provide the challenge to the authenticator response generator 1507 and to the authenticator I/O element 1505 for transmission to the authenticated unit 1502. In accordance with one embodiment the challenge generator 1506 is a pseudo-random number generator. The challenge generator 1506 may be a random-number generator. The challenge may be formed in any way that produces a sequence of bits, including calculation from a seed or pass-phrase, a selected sequence of bits chosen from a predetermined set of challenge sequences stored in static memory or a pattern of sequences chosen from a dynamic memory, or any other suitable sequence of bits. The security of the authentication process will depend on the challenge generated, so the choice of challenge generator 106 may depend on the level of security required by the context of the authentication process. Typically, the strongest challenge will be derived from a true random-number generator.

In accordance with one embodiment, the challenge generator 1506 provides a 32 bit random sequence. Where the challenge is only provided once in the authentication process in accordance with one embodiment, a true random sequence can be utilized. In accordance with another embodiment, a challenge may need to be recreated at another time, typically using a seed or pass-phrase, in which case a pseudo-random sequence may be necessary. In accordance with one embodiment, the challenge generator provides the challenge serially, although it will be obvious to those having skill in the art that a challenge may be provided by the challenge generator 1506 in any format and converted to whatever format is required by the other elements.

The authenticator unit 1501 may include an authenticator memory 1508. In accordance with the disclosed embodiment, the authenticator memory 1508 may be a secure memory such that the stored bits may not be read, accessed, discerned or altered without permission. In accordance with the disclosed embodiment, the authenticator memory 1508 may be an electrically-erasable, programmable read-only memory (EEPROM). When sensitive data is stored in the authenticator memory 1508, a lock-out bit may be fused so that unauthorized read/write access to the sensitive data is not possible or made generally difficult. An integrated circuit embodying the authenticator memory 1508 may be designed to make probing or other physical methods of breaching the security of the authenticator memory 1508 difficult. The sensitive data may be encrypted before being stored in the authenticator memory 1508. As will be recognized by those skilled in the art, other forms of securing the sensitive data within authenticator memory 1508 may be employed.

The authenticator memory 1508 may store seed data. A given set of seed data may be associated with an authenticated unit 1502. Several authenticated units 1502 may each be associated with a different set of seed data. In accordance with one embodiment, the authenticator memory 1508 may store authenticated unit identification data for unique authenticated units 1502, each associated with substantially unique set of seed data.

The authenticator unit 1501 may include an authenticator response generator 1507. The authenticator response generator 1507 receives a challenge from the challenge generator 1506 and transforms the challenge to generate a sequence of bits that serves as the response in a challenge-response authentication protocol. The authenticator response generator 1507 may receive seed data from the authenticator memory 1508 for use in the transformation. The seed data may be associated with an authenticated unit 1502 so that the response generated by the authenticator response generator 1507 is associated with the authenticated unit 1502.

Functionally, the authenticator response generator 1507 may use any transformation function to generate the response. The strength and efficiency of the challenge-response authentication process depends largely on the transformation function used. In accordance with the described embodiment, the authenticator response generator 1507 uses a transformation function that is derived from a plurality of independent cyclic-redundancy code functions. An authenticator response generator 1507 using a specific transformation function in accordance with one embodiment is described with reference to figures two and seven.

The authenticated unit 1502 may include an authenticated I/O element 1509, an authenticated response generator 1510 and an authenticated memory 1511. In accordance with the disclosed embodiment, the authenticated I/O element 1509 is connected to a device 1504, an authenticator unit 1501, an authenticated response generator 1510 and an authenticated memory 1511. The authenticated response generator 1510 may be connected directly to the authenticated memory 1511, or may be connected to the authenticated memory 1511 through the authenticated I/O element 1509.

The authenticated unit 1501 may include an authenticated I/O element 1509. The authenticated I/O element 1509 may control communication between the elements of the authenticated unit 1502, the authenticator unit 1501 and the device 1504. The authenticated I/O element 1509 may include passive connection elements including one or more ports, jacks, wire connectors or other passive connection elements. The authenticated I/O element 1509 may include active connection elements including processors, transmitters, receivers, modulators, demodulators, logic circuits, or other active connection elements. The authenticated I/O element 1509 may include software connection elements to control the processing, transmission and reception of the communications.

The authenticated unit 1502 may include an authenticated memory 1511. In accordance with the disclosed embodiment, the authenticated memory 1511 may be a secure memory such that the stored bits may not be read, accessed, discerned or altered without permission. In accordance with the disclosed embodiment, the authenticated memory 1511 may be an electrically-erasable, programmable read-only memory (EEPROM). When sensitive data is stored in the authenticated memory 1511, a lock-out bit may be fused so that unauthorized read/write access to the sensitive data is not possible or made generally difficult. An integrated circuit embodying the authenticated memory 1511 may be designed to make probing or other physical methods of breaching the security of the authenticated memory 1511 difficult. The sensitive data may be encrypted before being stored in the authenticated memory 1511. As will be recognized by those skilled in the art, other forms of securing the sensitive data within authenticated memory 1511 may be employed.

The authenticated unit 1502 may include an authenticated response generator 1510. The authenticated response generator 1510 receives a challenge from the authenticated I/O element 1509 and transforms the challenge to generate a sequence of bits that serves as the response in a challenge-response authentication protocol. Typically the transform function performed by the authenticated response generator 1510 is identical to the transform function performed by the authenticator response generator 1507. In accordance with another embodiment, the transform function of the authenticated response generator 1510 is the inverse or otherwise related to the transform function of the authenticator response generator 1507. The authenticated response generator 1510 may receive seed data from the authenticated memory 1511 for use in the transformation.

Functionally, the authenticated response generator 1510 may use any transformation function to generate the response. The strength and efficiency of the challenge-response authentication process depends largely on the transformation function used. In accordance with the described embodiment, the authenticated response generator 1510 uses a transformation function that is derived from a plurality of independent cyclic-redundancy code functions. An authenticated response generator 1510 using a specific transformation function in accordance with one embodiment is described with reference to figures two and seven.

The authenticator unit 1501 and the authenticated unit 1502 communicate with each other through the authenticator I/O element 1505 and the authenticated I/O element 1509. Typically, the communication is established by a direct connection of physical electrically conductive contacts. As will be recognized by those skilled in the art, other forms of communication may be implemented as appropriate to the context of the authentication process. The communication may be performed using communication lines or wireless communication. The communication may be established using a packet-based network protocol, optical signaling or mechanical signals. The communication may be performed using more than one method of communication, as appropriate.

Figure 16:
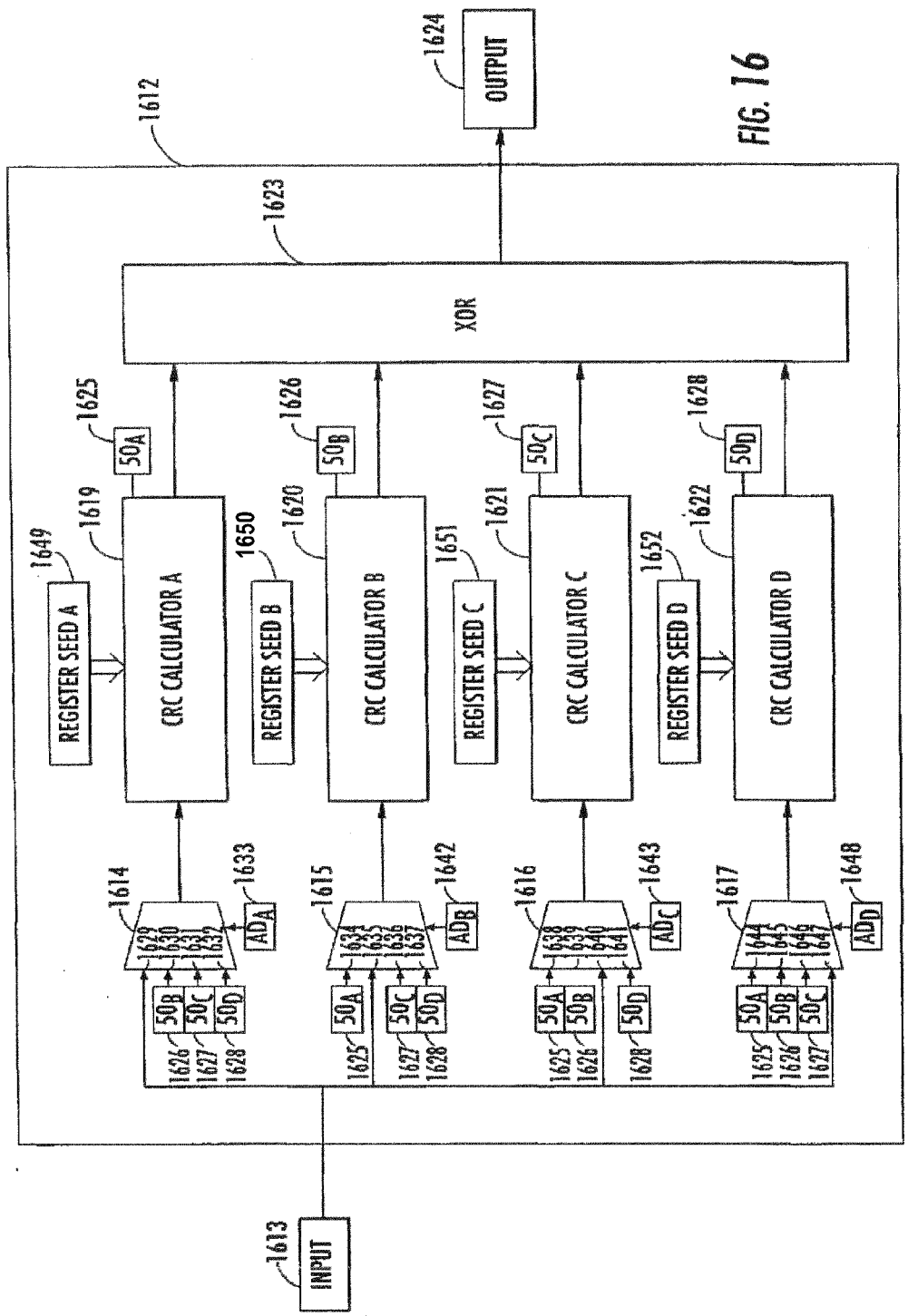
FIG. 16 illustrates a functional block diagram showing details of a response generator element.

With reference to FIG. 16, a functional block diagram of a response generator 1612 in accordance with one embodiment is shown. The response generator 1612 may be used as authenticator response generator 1505 and authenticated response generator 1510 as shown in FIG. 15. Although response generator 1612 is depicted as being implemented using discrete functional components, those skilled in the art will recognize that the actual implementation may be made from discrete components, integrated into a single integrated circuit, performed in software running on a processor or a combination of various hardware and software components. As well, the implementations of a response generator 1612 as an authenticator generator 1505 may differ from the implementation as an authenticated response generator 1510 while functionally the same.

The response generator 1612 typically receives an input bit stream from input 1613. In accordance with the disclosed embodiment, the input bit stream is the challenge of the challenge-response authentication protocol. The function of input 1613 may be performed by the challenge generator 1506, the authenticator I/O element 1505 or the authenticated I/O element 1509. The input 1613 provides the challenge bit stream to an input of a set of multiplexers 1614, 1615, 1616 and 1617.

In accordance with the disclosed embodiment, the response generator 1612 includes four multiplexers 1614, 1615, 1616 and 1617. Each of the four multiplexers 1620, 1621, 1622 and 1623 includes a set of addressable inputs. In accordance with the disclosed embodiment, the multiplexers each have four addressable inputs. The first multiplexer 1614 includes addressable inputs 1629, 1630, 1631 and 1632. The second multiplexer 1615 includes addressable inputs 1634, 1635, 1636 and 1637. The third multiplexer 1616 includes addressable inputs 1638, 1639, 1640 and 1641. The fourth multiplexer 1617 includes addressable inputs 1644, 1645, 1646 and 1647.

Each of the multiplexers 1614, 1615, 1616 and 1617 includes a two-bit address input 1633, 1642, 1643 and 1648. By applying two-bit input codes $AD_A$, $AD_B$, $AD_C$, and $AD_D$ to the two-bit address inputs 1633, 1642, 1643 and 1648, the multiplexer 1614, 1615, 1616 and 1617 selects one of the addressable inputs for output. For example, multiplexer 1614 includes addressable inputs 1629, 1630, 1631 and 1632. When $AD_A$ is set equal to 00 and is applied to the address input 1633, the input signal at input 1629 is output from the multiplexer 1614. When $AD_A$ is set equal to 01 and is applied to the address input 1633, the input signal at input 1630 is output from the multiplexer 1614. Similarly, each addressable input of each multiplexer may be selected by applying the appropriate address code to an appropriate address input. The input codes are typically received from secured memory, such as authenticator memory 1508 or authenticated memory 1511.

The output of each multiplexer 1614, 1615, 1616 and 1617 is input bit-wise into one of a set of CRC calculators 1619, 1620, 1621 and 1622, respectively. The CRC calculators 1619, 1620, 1621 and 1622 are each initialized with a register seed 1649, 1650, 1651 and 1652 respectively. The register seeds 1649, 1650, 1651 and 1652 are typically received from a secure memory, such as authenticator memory 1508 or authenticated memory 1511.

In accordance with the disclosed embodiment, the CRC calculators 1619, 1620, 1621 and 1622 operate on each bit of the challenge in a serial fashion. With each calculation cycle, a bit of the challenge sequence is input to one of the inputs of each multiplexer 1614, 1615, 1616 and 1617. With each calculation cycle, a serial output bit $SO_A$ 1625, $SO_B$ 1626, $SO_C$ 1627, and $SO_D$ 1628 is output from each of the respective CRC calculators 1619, 1620, 1621 and 1622. In accordance with the disclosed embodiment, the serial output bits 1625, 1626, 1627 and 1628 are fed back to the addressable inputs of the multiplexers 1614, 1615, 1616 and 1617.

The feedback of the serial output bits 1625, 1626, 1627 and 1628 from the CRC calculators 1619, 1620, 1621 and 1622 to the addressable inputs of the multiplexers 1614, 1615, 1616 and 1617 may be patterned to provide greater unpredictability in the final output of the response generator 1612. In accordance with the disclosed embodiment, the input 1613 is fed to the first addressable input 1629 of the first multiplexer 1614, the second addressable input 1635 of the second multiplexer 1615, the third addressable input 1640 of the third multiplexer 1616 and the fourth addressable input 1647 of the third multiplexer 1617. The serial output bit 1625 of the first CRC calculator 1619 is fed to the first addressable input 1634 of the second multiplexer 1615, the first addressable input 1638 of the third multiplexer 1616 and the first addressable input 1644 of the fourth multiplexer 1617. The serial output bit 1626 of the second CRC calculator 1620 is fed to the second addressable input 1630 of the first multiplexer 1614, the second addressable input 1639 of the third multiplexer 1616 and the second addressable input 1645 of the fourth multiplexer 1617. The serial output bit 1627 of the third CRC calculator 1621 is fed to the third addressable input 1631 of the first multiplexer 1614, the third addressable input 1636 of the second multiplexer 1615 and the third addressable input 1646 of the fourth multiplexer 1617. The serial output bit 1628 of the fourth CRC calculator 1622 is fed to the fourth addressable input 1632 of the first multiplexer 1614, the fourth addressable input 1637 of the second multiplexer 1615 and the fourth addressable input 1641 of the third multiplexer 1616. Those skilled in the art will recognize that other feedback patterns could be implemented.

When the entire input bit-sequence provided by input 1613 has been processed by the CRC calculators 1619, 1620, 1621 and 1622, an eight-bit output sequence is output from each CRC calculator 1619, 1620, 1621 and 1622 respectively. The eight-bit output sequences are input into an exclusive-or element 1623 which performs a bit-wise exclusive-or function on the eight-bit output sequences to generate an eight-bit response sequence where the first bit of the response sequence is the exclusive-or of the first bit of each of the eight-bit output sequences and so forth. In accordance with another embodiment, the eight-bit output sequences are shifted relatively, such that the second output sequence is right-shifted by two bits relative to the first output sequence, the third output sequence is right-shifted by four bits relative to the first output sequence and the fourth output sequence is right-shifted by six bits relative to the first output sequence. The shifted output sequences are then combined to form an eight-bit response sequence. The response is provided at output element 1624, typically as a serial message signal. The output element 1624 may be authenticator I/O element 1505 when the response generator 1512 is used as an authenticator response generator 1507. The output element 1524 may be authenticated I/O element 1509 when the response generator 1512 is used as an authenticated response generator 1510.

Figure 17:
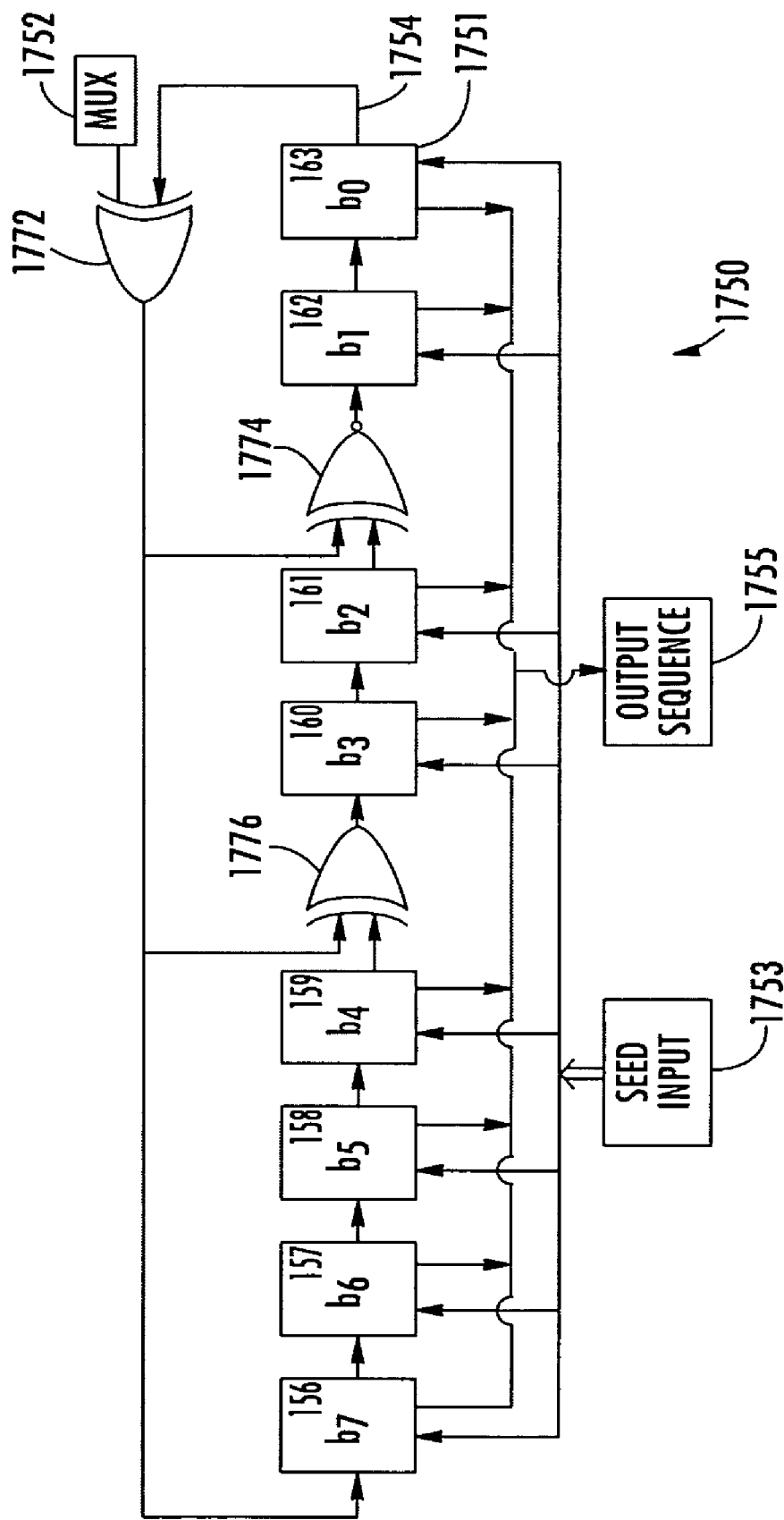
FIG. 17 illustrates a flow chart of an initialization process for a challenge-response authentication system.

With reference to FIG. 17, a functional block diagram of a CRC calculator 1750 in accordance with the disclosed embodiment is shown. Although the functional block diagram of the CRC calculator 1750 is shown as implemented with discrete elements, it will be recognized by those skilled in the art that the functions of the CRC calculator 1750 may be rendered in other implementations. The functions may be implemented in one or more integrated circuits, logic circuits, software running on a processor or combinations of these implementation components. The specific manner of implementation may depend on the parameters and context of the embodiments. It will be recognized by those having skill in the art that there are other known manners of implementing a CRC calculator 1750 beside the shift-register model, and that in particular, a CRC calculator 1750 may be implemented using a look-up table. Any specific implementation of a CRC calculator 1750 may be chosen if the outputs necessary to the embodiment are available.

The CRC calculator 1750 includes a shift register 1751 containing register locations 1756, 1757, 1758, 1759, 1760, 1761, 1762 and 1763. In accordance with the disclosed embodiment, the shift register 1751 includes eight register locations. It will be recognized by those skilled in the art that CRC calculators 1750 having more or less than eight register locations can be used. The shift register stores a bit b in each register location, such that a first bit $b_7$ is stored in a first register location 1756, a second bit $b_6$ is stored in a second register location 1757, a third bit $b_5$ is stored in a third register location 1758, a fourth bit $b_4$ is stored in a fourth register location 1759, a fifth bit $b_3$ is stored in a fifth register location 1760, a sixth bit $b_2$ is stored in a sixth register location 1761, a seventh bit $b_1$ is stored in a seventh register location 1762 and an eighth bit $b_0$ is stored in a eighth register location 1763. With each calculation cycle, the bit $b_0$ stored in the eighth register location 1763 is output as the serial output 1754, the bit $b_1$ stored in the seventh register location 1762 is moved into the eighth register location 1763, the bit $b_2$ stored in the sixth register location 1761 is moved into the seventh register location 1762, the bit $b_3$ stored in the fifth register location 1760 is moved into the sixth register location 1761, the bit $b_4$ stored in the fourth register location 1759 is moved into the fifth register location 1760, the bit $b_5$ stored in the third register location 1758 is moved into the fourth register location 1759, the bit $b_6$ stored in the second register location 1757 is moved into the third register location 1758, the bit $b_7$ stored in the first register location 1756 is moved into the second register location 1757, and an input bit from serial input 1752 is combined (exclusive-or 1772) with the serial output bit 1754 and moved into the first register location 1756.

Each of the register locations 1756, 1757, 1758, 1759, 1760, 1761, 1762 and 1763 initially store a seed bit input from seed input 1753. In the disclosed embodiment, the seed input 1753 is an authenticator memory 1508 or an authenticated memory 1511.

The CRC calculator 1750 uses a polynomial code p to calculate an output sequence 1755. In accordance with the disclosed embodiment, the polynomial code p is an six-bit binary code represents a three-bit positive power and a three-bit negative power. The positive power locates the position of a positive feedback term, an exclusive-or function 1776, in the bit sequence of the CRC register 1751. A zero represents no positive feedback term. The negative power locates the position of a negative feedback term, an exclusive-nor function 1774, in the bit sequence of the CRC register 1751. A zero represents no negative feedback term. In the disclosed embodiment, the three-bit positive power is 2 and the three bit negative power is 4.

In accordance with the standard CRC calculation, when the serial output bit 1754 is equal to a "1," each bit stored in the shift register 1751 is added (where binary adding is equal to the exclusive-or function and binary subtraction is equal to the exclusive-nor function) to the corresponding bit of the polynomial represented by p. In accordance with the disclosed embodiment, the exclusive-or 1776 and the exclusive-nor 1774 operate on the respective bits in accordance with their position and the exclusive-or of the serial output bit and the serial input bit.

After the final bit from the serial input 1752 has been shifted into the first register location 1756 and the polynomial p has been added to the contents of the shift register where appropriate, the final contents of the shift register are received by output 1755.

Figure 18:
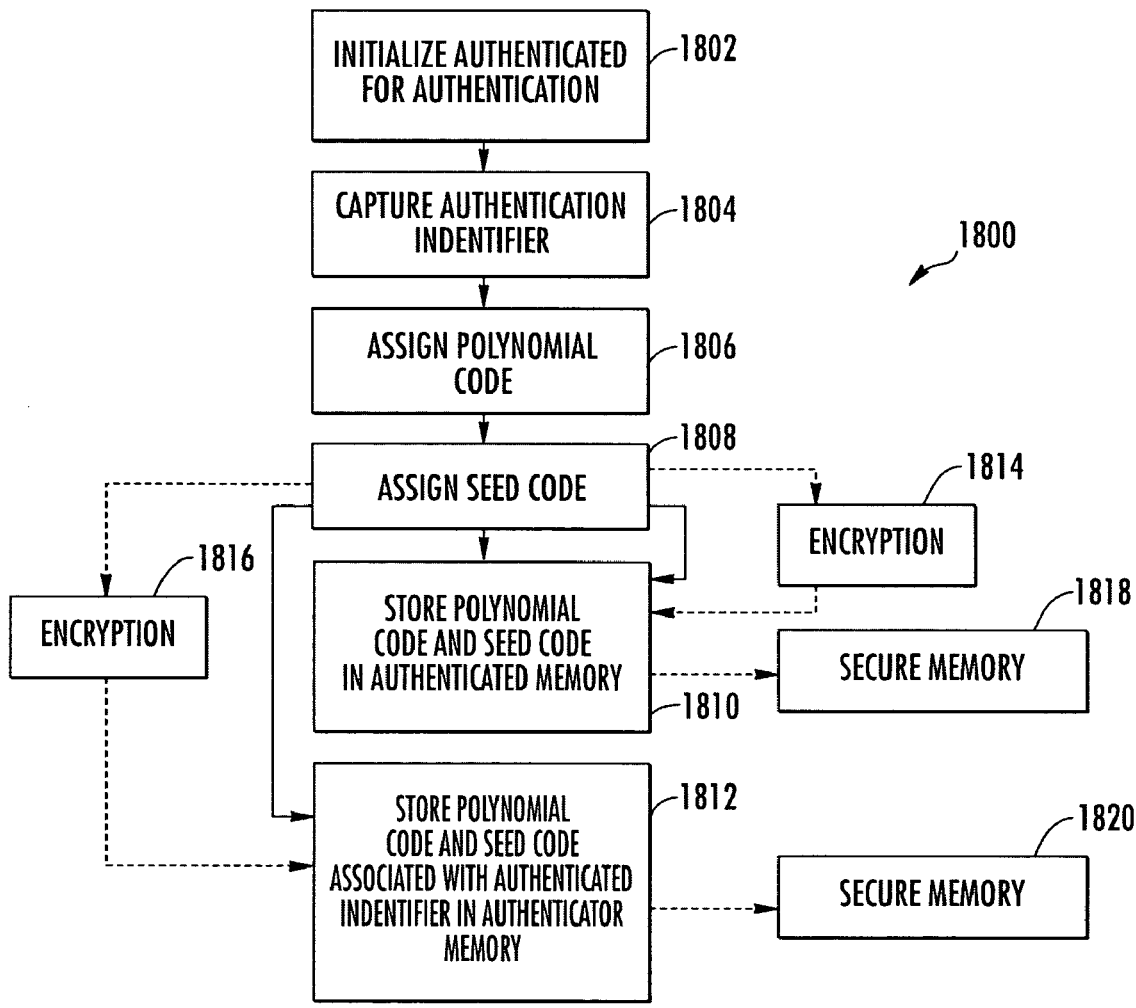
FIG. 18. illustrates a flow chart of a challenge-response authentication process in a challenge-response authentication system.

With reference to FIG. 18, a flow chart for the initialization 1800 of an authenticated unit 1502 with an authenticator unit 1501 is shown. The authenticated unit 1502 is communicably connected to an authenticator unit 1501 to initialize the authenticated unit 1502 in function block 1802. Those having skill in the art will recognize that the authenticator unit 1501 in this initialization protocol need not physically be the same authenticator unit 1501 that performs the authentication protocol. The initialization protocol requires continuity of information stored, rather than physical identity.

The authenticator unit 1501 may capture an authenticated identification code associated with the authenticated unit 1804 in function block 1804. The authenticated identification code may be read from the authenticated memory 1508 or may be concurrently assigned to the authenticated unit 1502 and stored in the authenticated memory 1508. The authenticated identification code may identify a particular authenticated unit 1502 or may identify a class or type of authenticated units. In accordance with another embodiment, where the initialization is not tailored to a specific authenticated unit 1501 or authenticated unit type, an authenticated identification code may not be used and the step may be omitted.

The process proceeds to function block 1806 where the authenticator unit 1501 assigns a polynomial code. Typically the polynomial code is chosen from a set of predetermined polynomial codes. The polynomial code may be chosen from the set of predetermined polynomial codes randomly or in accordance with a predetermined pattern. The polynomial code may be generated randomly or in accordance with a polynomial code generation protocol. In accordance with the disclosed embodiment, the polynomial code is an eight-bit binary code. Those skilled in the art will recognize that a polynomial code appropriate to a given implementation may be larger or smaller than eight bits, or may be represented in other forms as appropriate.

The process proceeds to function block 1808 where a seed code is assigned. Typically the seed code is generated randomly. The seed code may be chosen from a set of predetermined seed codes. The seed code may be chosen from a set of predetermined seed codes randomly or in accordance with a predetermined pattern. In accordance with the disclosed embodiment, the seed code is an eight-bit binary code. Those skilled in the art will recognize that a seed code appropriate to a given implementation may be larger or smaller than eight bits, or may be represented in other forms as appropriate.

The process proceeds to function blocks 1810 and 1812. In function block 1810, the polynomial code and seed code are stored in the authenticated memory 1511. In function block 1812, the polynomial code and seed code are stored in the authenticator memory 1508. Where an authenticated identification code has been associated with the authenticated unit 1502, the polynomial code and seed code are stored in the authenticator memory 1508 in association with the authenticated identification code. The polynomial code and seed code may be encrypted in function block 1814 before they are stored in the authenticated memory 1511 in function block 1810. The polynomial code and seed code may be encrypted in function block 1816 before they are stored in the authenticator memory 1508 in function block 1812. The authenticated identification code may also be encrypted at function block 1816, depending on security considerations and implemented data recovery techniques.

When the polynomial code and seed code have been stored in the authenticated memory 1508 in function block 1810, the process may proceed to function block 1818 where the data stored within the authenticated memory 1511 is secured. The step of securing the data within the authenticated memory 1511 may involve digital security measure, physical security measure or both. Those skilled in the art will recognize that the authenticated memory 1511 may be secured before this point and further security measures may follow.

When the polynomial code and seed code have been stored in the authenticator memory 1505 in function block 1812, the process may proceed to function block 1820 where the data stored within the authenticator memory 1508 is secured. The step of securing the data within the authenticator memory 1508 may involve digital security measure, physical security measure or both. Those skilled in the art will recognize that the authenticator memory 1508 may be secured before this point and further security measures may follow.

Figure 19:
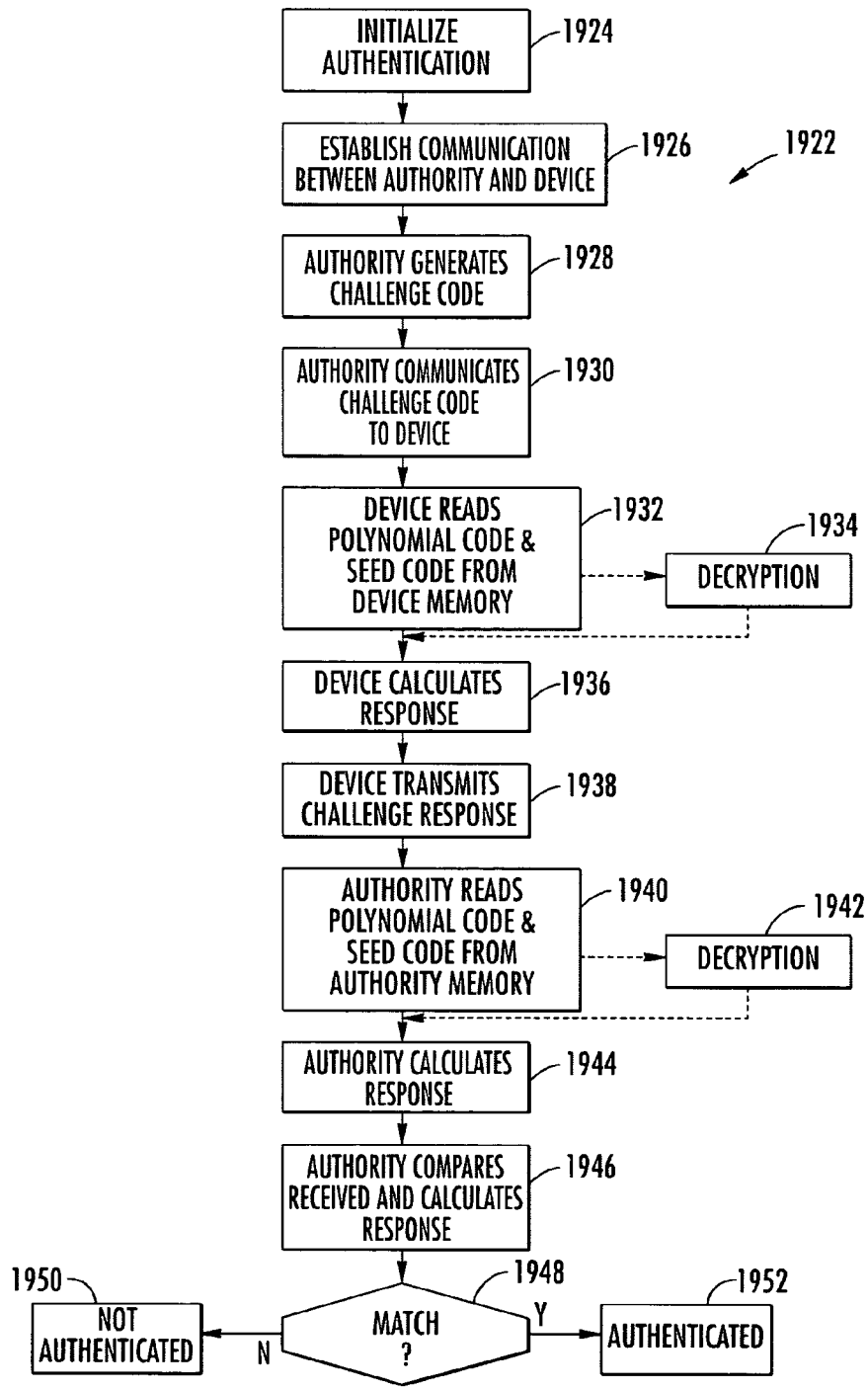
FIG. 19 illustrates a flow chart of an authentication initialization process within the challenge-response authentication process.

With reference to FIG. 19, a flow chart of an authentication process 1922 for authenticating an authenticated unit 1502 or device 1504 to an authenticator unit 1501 or authority 1503. The authentication is initialized in function block 1924. The process proceeds to function block 1926 where communication is established between the authority 1503 and the device 1504. Typically communication between the authority 1503 and the device 1504 is established by direct connection of the authenticator I/O element 1505 with the authenticated I/O element 1509.

The process proceeds to function block 1828 where the authority 1503 generates a challenge code. In accordance with the disclosed embodiment, the challenge code is generated by the challenge generator 1506. The authority 1503 sends the challenge code to the device 1504 in function block 1930.

The device 1504 reads the polynomial code and seed code stored at the device 1504 and inputs the polynomial code and seed code into the authenticated response generator 1510 at function block 1932. Typically, this step will be performed as part of the authentication initialization at function block 1924 or subsequently before the response calculation. The polynomial code and seed code may be decrypted as necessary in function block 1934.

Using the polynomial code, the seed code and the challenge code, the device 1504 calculates a response at function block 1936. In accordance with the disclosed embodiment, the response is calculated using the authenticated response generator 1510. The device 1504 transmits a challenge response to the authority 1503 at function block 1938.

The authority 1503 reads the polynomial code and seed code from an authority memory 1508 in function block 1940. Where the polynomial code and seed code in authority memory 1508 is stored in association with an authenticated identification code, the authority 1503 receives the authenticated identification code and reads the associated polynomial code and seed code from the authority memory 1508. When the polynomial code and seed code have been stored in an encrypted form, the codes are decrypted at function block 1942. Using the challenge code, the polynomial code and the seed code, the authority 1503 calculates the response code at function block 1944. In accordance with the disclosed embodiment, the authority 1503 calculates the response code with the authenticator response generator 1507.

The authority 1503 compares the response code from the challenge response received from the device 1504 with the response code calculated by the authority 1503 at function block 1946. If the received and calculated response codes are equal at decision block 1948, the process follows the YES path to function block 1952 where the device authentication status is established as authenticated. If the received and calculated response codes are not equal at decision block 1948, the process follows the NO path to function block 1950 where the device authentication status is established as not authenticated. Actions may be taken by the authority 1503 in response to the device authentication status will vary depending on the context of the authentication. For example, the authority 1503 may allow the device 1504 access to resources when the device 1504 has been authenticated. The authority 1503 may refuse further communication with the device 1504 when the device 1504 has not been authenticated.

Figure 20:
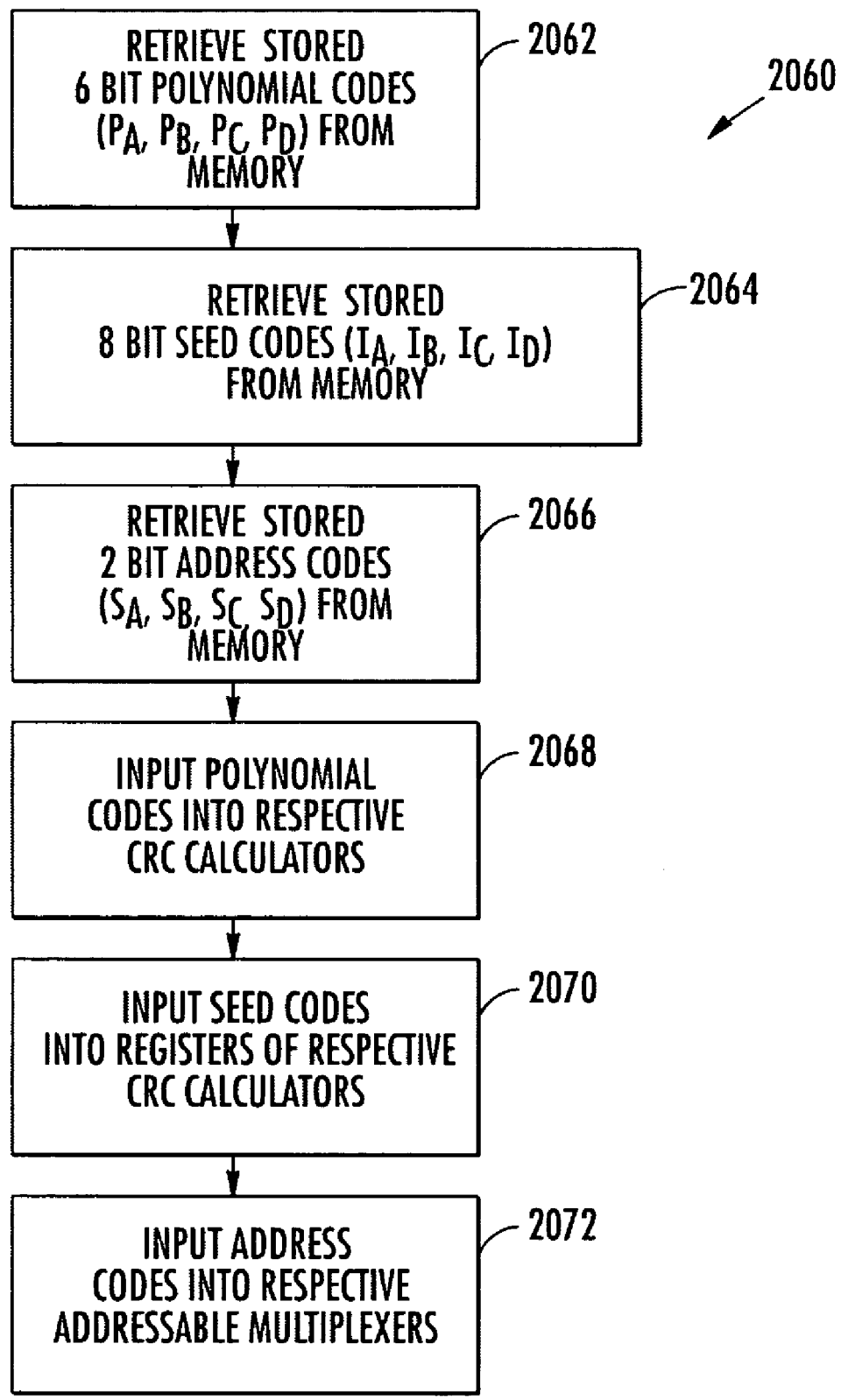
FIG. 20 illustrates a shift-register CRC calculator.

With reference to FIG. 20, a flow chart of a process 2060 for initializing a response generator 1512 is shown. The process begins in function block 2062 as stored polynomial codes are retrieved from memory. In accordance with the disclosed embodiment, the stored polynomial code is represented as six-bit binary code, such that there are only two non-zero polynomial coefficients between the powers of 8 and 0. The coefficients of the 8 and zero powers are set to one. The first three bits of the six-bit binary code identify the first power with a non-zero coefficient an the second three bits of the six-bit binary code identify the second power with a non-zero coefficient. The stored polynomial code representations are translated to eight-bit polynomial codes $p_1$, $p_2$, $p_3$ and $p_4$.

The process proceeds to function block 2064 as stored seed codes are retrieved from memory. In accordance with the disclosed embodiment, the stored seed codes are stored as eight-bit binary codes.

The process proceeds to function block 2066 as stored address codes are retrieved from memory. In accordance with the disclosed embodiment, the stored address codes are stored as two-bit binary codes.

The process proceeds to function block 2068 as the polynomial codes are input into the respective CRC calculators. In accordance with the disclosed embodiment, the stored polynomial codes are decoded before the polynomial codes are input into the respective CRC calculators. The CRC calculators may make the necessary assumptions so that the stored polynomial codes may be input directly into the CRC calculators.

The process proceeds to function block 2070 as the seed codes are input into the registers of the respective CRC calculators. The process proceeds to function bock 1972 as the stored address codes are input into the each of the respective multiplexers.

Figure 21:
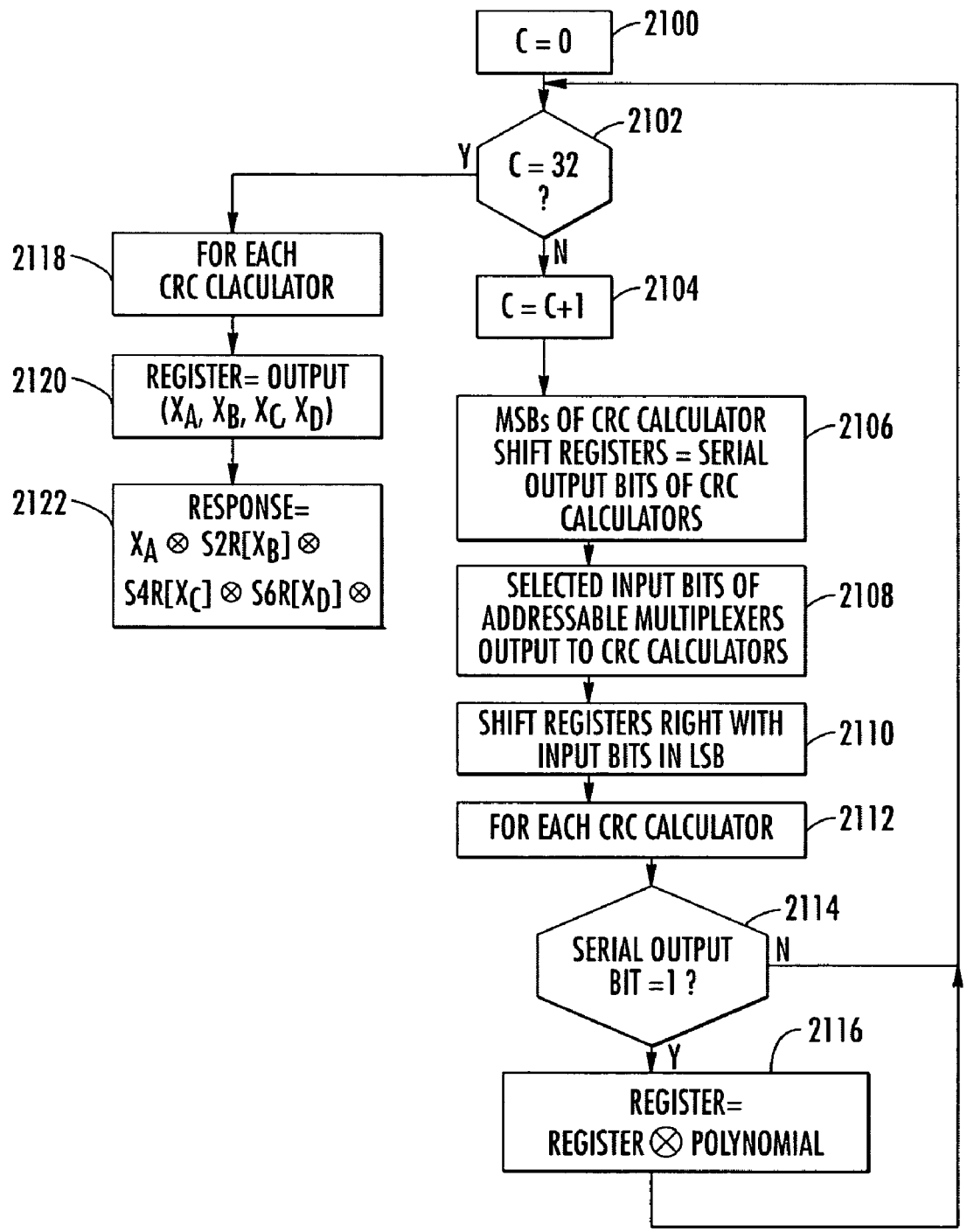
FIG. 21 illustrates a flow chart of a response calculation process.

With reference to FIG. 21, a flow chart of a CRC algorithm suitable for the disclosed response generator 1612 is shown. The process begins at function block 2100 by initializing a counter. At decision block 2102, the process determines if the counter has reached the number of bits in the challenge sequence. In the described embodiment, the number of bits in the challenge sequence is 32. If the counter has not reached 32, the process continues along the YES path to function block 2104, where the counter is incremented. The process continues to function block 2106 where the serial output bit of each CRC calculator is set equal to the most-significant bit (MSB) of the CRC calculator shift registers. At function block 2108, the selected input bits of the addressable multiplexers are output to the CRC calculators. The process continues to function block 2110 which shifts the data in the shift register to the right, placing the input bits into the least-significant-bits (LSB) of each shift register. For each shift register, at function block 2112, the serial output bit is read. If the serial output bit is equal to one at decision block 2114, the process continues along the YES path to function block 2116 where the each register location is replaced by the XOR of the bit in the register location and the respective bit of the polynomial code. The process then returns to decision block 2002 to determine if the counter has reached 32. If the serial output bit is equal to zero at decision block 2014, the process follows the NO path and returns to decision block 2102 to determine if the counter has reached 32.

If the counter has reached 32 at decision block 2102, the process follows the YES path to function block 2118. For each CRC calculator, the output sequence is set equal to the bits in the CRC calculator shift register. The process continues at function block 2122 where the response is set equal to the XOR of the outputs from the CRC calculators.

Figure 22:
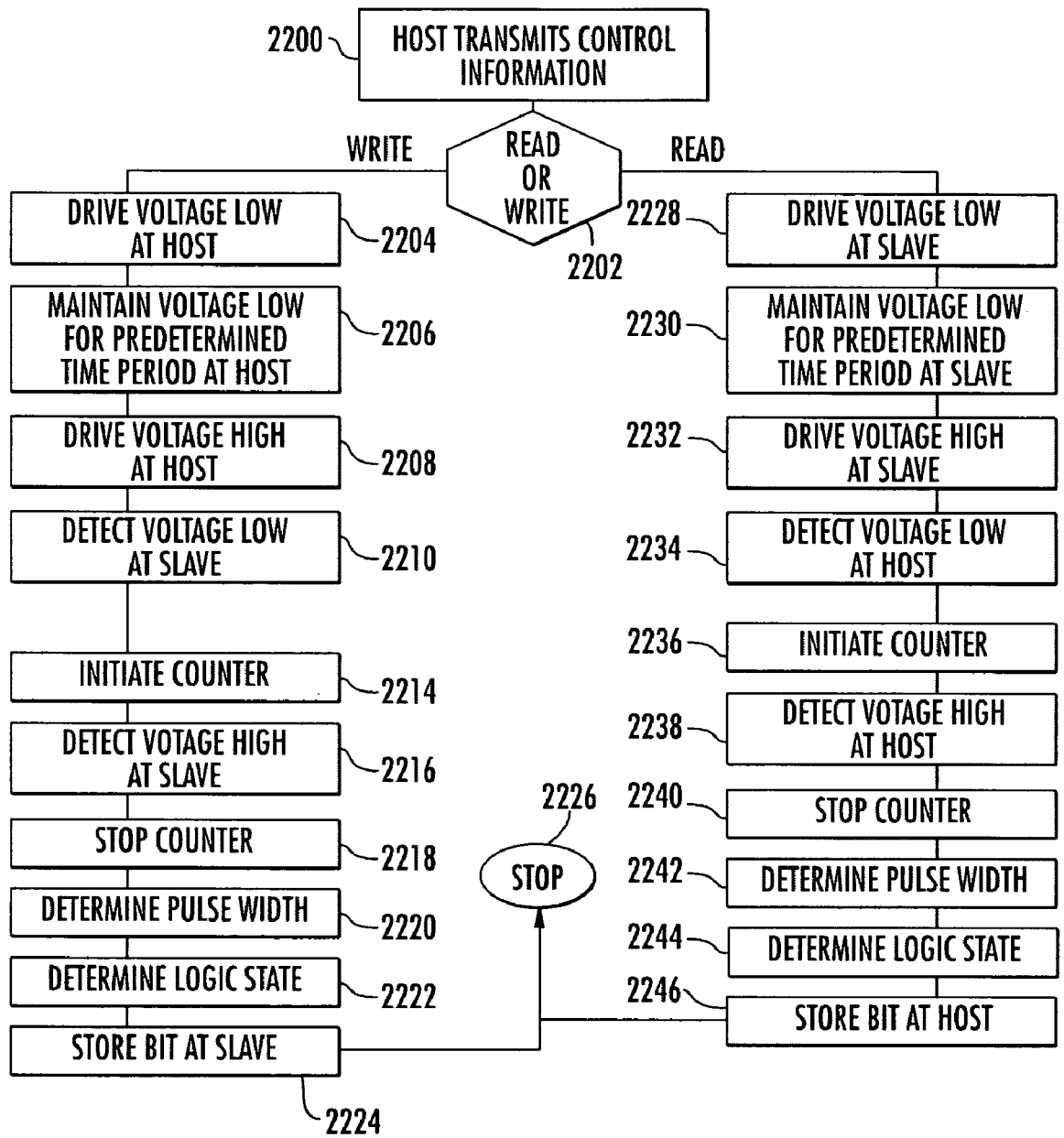
FIG. 22 is a flow diagram illustrating the authentication process using a single wire protocol.

Referring now to FIG. 22, there is illustrated a flow diagram describing the operation of the pseudo-synchronous single wire bidirectional interface with respect to the battery authentication process for a cellular telephone 1401. Initially, at step 2200 the cellular telephone 1401 transmits the 16-bit instruction packet to the battery 1402 containing all control information for the authorization operation. Inquiry step 2202 determines whether or not the control information indicates that the operation is a Write operation or Read operation. Initially, the cellular telephone 1401 will Write the 32 bit random challenge code to the battery 1402. The cellular telephone 1401 drives at step 2204 the voltage level low on line 1414. This provides an indication of the start of the transmission of a logical "1" or "0" data bit. The voltage level is maintained low at step 2206 for a predetermined period of time by the host based upon whether a logical "0" or logical "1" is being transmitted. Whether a logical "1" or logical "0" bit is being transmitted is dependent on the 32-bit random code generated by the cellular telephone 1401. When the predetermined time period associated with the logical "0" or logical "1" has expired, the cellular telephone 1401 drives the voltage level high at step 2208. The pulse generated at the host is transmitted along the single line 1414 until it reaches the battery 1402. This process repeats at inquiry step 2209 until the entire 32-bit random challenge code is transmitted.

The battery 1402 detects the voltage low level indicating the beginning of a transmission pulse at step 2210. In response to the detection of the falling pulse edge at step 2210, the battery 1402 initiates, at step 2214, a counter to assist in measuring the width of the pulse which is about to be received. The battery 1402 next detects at step 2216 the voltage level going high on line 114. In response to the rising pulse edge on line 114, the battery 1402 will stop at step 2218 the counter initiated at step 2214.

Using the information stored within the counter, the combinational logic within the battery 102 may determine, at step 2220, the width of the pulse transmitted from the cellular telephone 101. The determined pulse width is used, at step 2222, to determine whether a logical "1" or "0" bit was transmitted. The determined bit is stored at the battery at step 2224 at the location indicated by the block field 606 and address field 608 of the instruction packet 600. The process at the battery 1402 continues until inquiry step 2225 determines the entire 32 bit random challenge code have been written to the battery. The Write process ends at step 2226.

If the battery 1402 has performed the hash process described in FIGS. 15 and 16, the cellular telephone 1401 will Read the CRC authentication code from the battery 1402. The battery 1402 drives the voltage level on line 1414 low at step 1428. The battery 1402 device maintains at step 1430 the voltage level low for a predetermined period of time associated with whether a logical "1" or "0" bit is being transmitted from the battery 1402 to the cellular telephone 1401. Once the predetermined period has expired, the battery 1402 will drive the voltage level high at step 2232 indicating the end of the transmitted logical data bit. The pulse is transmitted along line 1414 until the falling pulse edge is detected by the cellular telephone 1401 at step 2234.

In response to receipt of a falling clock edge, the cellular telephone 1401 will initiate a counter at step 2236 to assist in measuring the width of the pulse being received. At step 2238, the cellular telephone 1401 will detect the voltage level on line 1414 going high. In response to the rising edge of the pulse, the cellular telephone 1401 will stop the counter at step 2240. The CPU 1422 within the cellular telephone 1401 utilizes the information within the counter to determine at step 2242 the width of the pulse. Using the width of the pulse, a logical "1" or logical "0" state may be determined at step 2244. The logical bit determined at step 2244 is stored at the cellular telephone at step 2246 in the location indicated by the block and address fields provided within the instruction packet 300. The Read process ends at step 2226.

Figure 23:
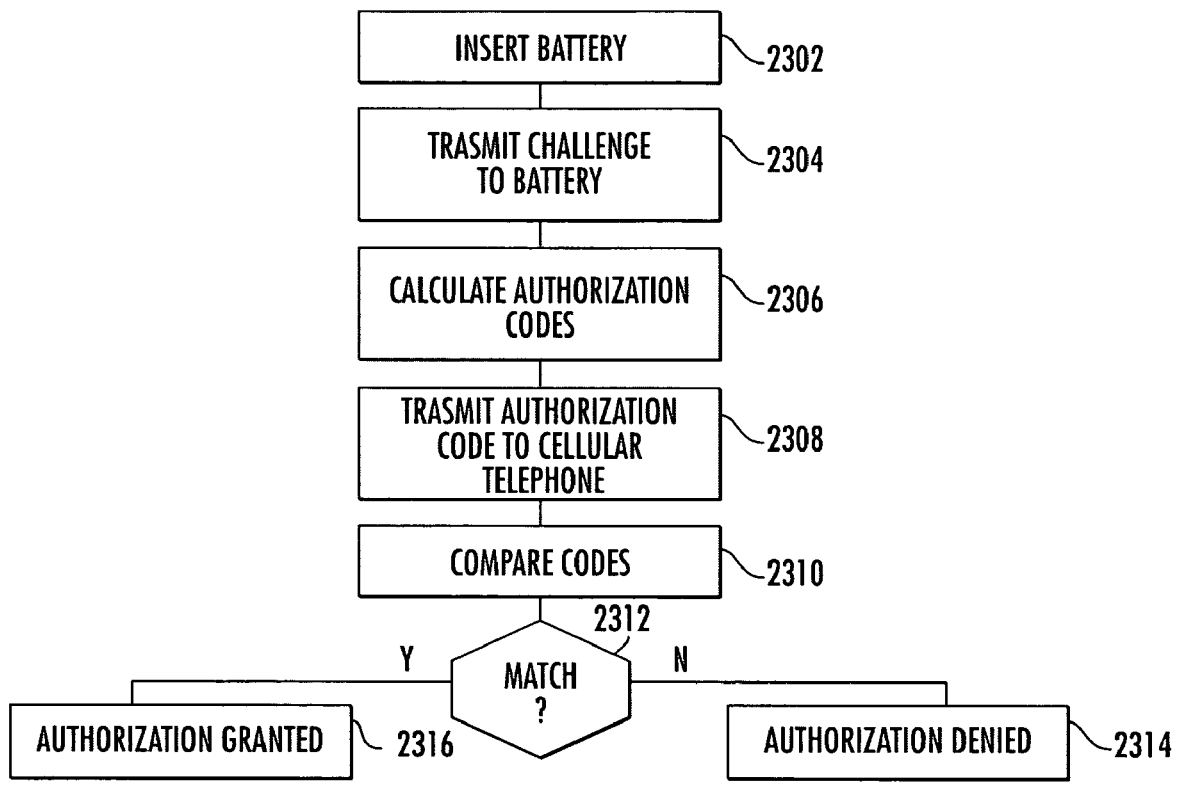
FIG. 23 is a flow diagram illustrating authentication of a battery by a cellular telephone.

Using the above described authorization method and single wire data transmission method, a cellular telephone 1401 may be authorized to operate with an inserted battery 1402 in the manner described in FIG. 23. The battery 1402 is inserted into the cellular telephone 1401 at step 2302. The cellular telephone 1401 and the battery 1402 have a predetermined 64-bit code stored within the hash algorithms stored in the devices. The cellular telephone 1401 transmits, at step 2304, the 32-bit random challenge code to the battery 1402 using the single wire transmission method described above in FIG. 17. Both the cellular telephone 1401 and the battery 1402 calculate an authorization code at step 2306 using the 64-bit code in their respective hash algorithms and the 32-bit random challenge code. The battery 1402 transmits, at step 2308, its authorization code back to the cellular telephone 1401 using the single wire transmission method described in FIG. 17. A comparison of the authorization codes generated by the battery 1402 and the cellular telephone 1401 is performed at step 2310. Inquiry step 1812 determines if the authorization codes match. If not, authorization of the battery 1402 is denied at step 2314, and the cellular telephone 1401 is deactivated. If the codes match, authorization is granted at step 2316, and the cellular telephone 1401 may operate with the battery 1402.

Although the preferred embodiment has been described in detail, it should be understood that various changes, substitutions and alterations can be made therein without departing from the spirit and scope of the invention as defined by the appended claims.

What is claimed is:

1. An authentication system, comprising:
   a first device comprising:
      a first device input/output interface for communicating with a connected battery;
      a first device response generator for generating a first challenge response responsive to a challenge received over the first device input/output interface and locally stored seed values, the first device response generator comprising:
  a first plurality of multiplexers, each multiplexer of the first plurality of multiplexers connecting one of a plurality of inputs of the multiplexer to an output of the multiplexer responsive to a first stored address code, each of the first plurality of multiplexers having an input of the plurality of inputs connected to receive the first challenge response;
  a first plurality of hash function calculators each having an input connected to one of the plurality of multiplexers and a first output and a second output, the first output of each of the first plurality of hash function calculators connected to at least two of the plurality of inputs of the first plurality of multiplexers, each of the first plurality of hash function calculators generating an output bit on each of the first output of the first plurality of hash function calculations and the second output of the first plurality of hash function calculations responsive to the challenge and the locally stored seed values;
  a first logic circuit connected to each of the second outputs of the first plurality of hash function calculators for combining the outputs of each of the first plurality of hash function calculators into the first challenge response;
  a first memory for storing the seed values and the address codes;
a connected battery comprising:
  a second device input/output interface for communicating with the first device;
  a second device response generator for generating a challenge response responsive to a challenge received over the second device input/output interface and locally stored seed values, the second device response generator comprising:
    a second plurality of multiplexers, each multiplexer of the second plurality of multiplexers connecting one of a plurality of inputs of the multiplexer to an output of the multiplexer responsive to a stored address code, each of the second plurality of multiplexers having an input of the plurality of inputs connected to receive the second challenge response;
    a second plurality of hash function calculators each having an input connected to one of the second plurality of multiplexers and a first output and a second output, the first output of each of the second plurality of hash function calculators connected to at least two of the plurality of inputs of the second plurality of multiplexers, each of the second plurality of hash function calculators generating an output bit on each of the first output of the second plurality of hash function calculators and the second output of the second plurality of hash function calculators responsive to the challenge and the locally stored seed values;
    a second logic circuit connected to each of the second outputs of the second plurality of hash function calculators for combining the outputs of each of the second plurality of hash function calculators into the second challenge response;
    a second memory for storing the seed values and the address codes; and
  wherein the first device compares the first challenge response with the second challenge response to determine whether to authenticate the connected battery.

2. The authentication system of claim 1, wherein the first and second logic circuits comprise an exclusive OR circuit.

3. The authentication system of claim 1, wherein the plurality of hash function calculators comprise a plurality of cyclic redundancy check (CRC) calculators.

4. The authentication system of claim 3, wherein the cyclic redundancy check (CRC) calculators are implemented in a shift register.

5. An authentication system for authenticating a battery to an associated electronic device, comprising:
  a device input/output interface for communicating with the associated electronic device;
  a device response generator for generating a challenge response responsive to a challenge received over the interface and locally stored seed values, the device response generator comprising:
    a plurality of multiplexers, each multiplexer of the plurality of multiplexers connecting one of a plurality of inputs to the multiplexer to an output of the multiplexer responsive to a stored address code, each of the plurality of multiplexers having an input of the plurality of inputs connected to receive the challenge response;
    a plurality of hash function calculators each having an input connected to one of the plurality of multiplexers and a first output and a second output, the first output of each of the plurality of hash function calculators connected to at least two of the plurality of inputs of the plurality of multiplexers, each of the plurality of hash function calculators generating an output bit on each of the first output and the second output responsive to the challenge and the locally stored seed values;
    a logic circuit connected to each of the second outputs of the plurality of hash function calculators for combining the outputs of each of the plurality of hash function calculators into the challenge response;
    a memory for storing the seed values and the address codes.

6. The authentication system of claim 5, wherein the logic circuit comprises an exclusive OR circuit.

7. The authentication system of claim 5, wherein the plurality of hash function calculators comprise a plurality of cyclic redundancy check (CRC) calculators.

8. The authentication system of claim 5, wherein said device response generator performs a hash function on the challenge to generate a hash code.

9. The authentication system of claim 6, wherein said seed values include a polynomial code.

10. The authentication system of claim 6, wherein said seed values include initial register values.

11. A method for authenticating a battery to an associated electronic device, comprising:
  receiving a challenge at the battery from the associated electronic device;
  multiplexing the challenge with outputs from a plurality of hash function processes to generate a plurality of multiplexed data streams, wherein the challenge is multiplexed with the outputs from the plurality of hash function processes responsive to a stored address code;
  performing hash function calculations on each of the multiplexed data streams responsive to locally stored seed values and the challenge to generate a first output and a second output—for each of the multiplexed data streams;
  providing the first output to be multiplexed into at least two of the multiplexed data streams;

combining the second outputs from each of the hash function calculations using a logic function to create a first challenge response, wherein the step of combining further comprise the step of exclusive ORing the second outputs from each of the hash function calculations;

forwarding the first challenge response from the battery to the associated electronic device.

12. The method of claim 11, further including the steps of:

comparing the first challenge response and a second challenge response generated at the associated electronic device; and determining whether to authenticate the battery responsive to the comparison.

13. The method of claim 11, wherein the steps of performing hash function calculations further comprise the step of performing cyclic redundancy check (CRC) calculations.

14. The method of claim 11, wherein the step of performing CRC calculations further comprises the step of performing cyclic redundancy check (CRC) calculations using a shift register.

\* \* \* \* \*